United States Patent
Suzuki et al.

(10) Patent No.: US 7,222,010 B2
(45) Date of Patent: May 22, 2007

(54) ROLLOVER DETERMINATION APPARATUS FOR VEHICLES

(75) Inventors: Ryoutarou Suzuki, Tokyo (JP); Satoru Inoue, Tokyo (JP); Masahiro Nakamoto, Tokyo (JP); Takashi Tokunaga, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 167 days.

(21) Appl. No.: 10/952,830

(22) Filed: Sep. 30, 2004

(65) Prior Publication Data

US 2005/0080544 A1    Apr. 14, 2005

(30) Foreign Application Priority Data

Oct. 8, 2003    (JP) .............................. 2003-349885

(51) Int. Cl.
*B60R 21/00* (2006.01)
*G01P 15/00* (2006.01)

(52) U.S. Cl. ......................................... 701/45; 340/440
(58) Field of Classification Search ..................... None
See application file for complete search history.

(56) References Cited

U.S. PATENT DOCUMENTS

| | | | |
|---|---|---|---|
| 6,038,495 A * | 3/2000 | Schiffmann | 701/1 |
| 6,301,536 B1 * | 10/2001 | Vaessen et al. | 701/45 |
| 6,584,388 B2 * | 6/2003 | Schubert et al. | 701/46 |
| 6,600,985 B2 * | 7/2003 | Weaver et al. | 701/45 |
| 7,017,700 B2 * | 3/2006 | Frimberger et al. | 180/282 |
| 2002/0087235 A1 * | 7/2002 | Aga et al. | 701/1 |
| 2002/0099486 A1 | 7/2002 | Nagao et al. | |
| 2004/0199317 A1 * | 10/2004 | Ogata et al. | 701/45 |
| 2005/0257981 A1 * | 11/2005 | Iyoda et al. | 180/282 |

FOREIGN PATENT DOCUMENTS

| | | |
|---|---|---|
| JP | 7-164985 A | 6/1995 |
| JP | 2001-83172 A | 3/2001 |
| JP | 2002-200951 A | 7/2002 |

* cited by examiner

*Primary Examiner*—Michael J. Zanelli
(74) *Attorney, Agent, or Firm*—Sughrue Mion, PLLC

(57) ABSTRACT

A rollover determination apparatus for vehicles includes a roll-angular-velocity sensor (1) for detecting, as a roll angular velocity, the rotational angular velocity of a vehicle about a longitudinal axis extending lengthwise through the vehicle, an upward-or-downward-acceleration sensor (2) for detecting, as an upward or downward acceleration, an acceleration in an upward or downward direction of the vehicle, an arithmetic processing unit (4a) for carrying out arithmetic processing on both the roll angular velocity detected by the roll-angular-velocity sensor (1) and the upward or downward acceleration detected by the upward-or-downward-acceleration sensor (2), and a rollover occurrence determining unit (4b) for determining whether the vehicle will roll over based on a processing result of the arithmetic processing unit (4a).

13 Claims, 13 Drawing Sheets

ROLLOVER DETERMINATION APPARATUS FOR VEHICLES

BACKGROUND OF THE INVENTION

1. Field of the Invention

The present invention relates to a rollover determination apparatus for determining whether a vehicle will roll over (or turn over) at proper timing.

2. Description of Related Art

Conventionally, there has been provided a method of determining whether a vehicle will roll over based on a two-dimensional map of the roll angle and roll angular velocity of the vehicle, as one of the most general rollover determination techniques. In accordance with this rollover determination method, if the roll angular velocity of the vehicle is very large or rapidly increases when the vehicle accidentally has a rollover, the timing of determination of whether the vehicle will roll over becomes late. In order to solve this problem, there has been provided a method of classifying the type of the occurrence of rollover according to the acceleration of the vehicle detected by acceleration sensors (of Y-axis and/or Z-axis), and using a rollover determination threshold map suitable for the type of the occurrence of rollover. In accordance with this method, whether the vehicle will roll over is determined by using the lateral acceleration, angular velocity, and roll angle of the vehicle (refer to patent reference 1, for example).

[Patent reference 1] Japanese patent application publication (TOKKAI) No. 2,002-200,951

A problem with the prior art determination method disclosed by above-mentioned patent reference 1 is that since the method determines whether a vehicle will roll over by using the following three factors: the lateral acceleration, roll angular velocity, and roll angle of the vehicle, it is impossible to determine whether the vehicle will roll over when the lateral acceleration does not occur in coincidence with the occurrence of the roll angular velocity, or it is erroneously determined that the vehicle will roll over when such an accident as a side crash actually occurs.

SUMMARY OF THE INVENTION

The present invention is made in order to solve the above-mentioned problem, and it is therefore an object of the present invention to provide a simple and flexible rollover determination apparatus for vehicles that can quickly and correctly determine whether a vehicle will roll over.

In accordance with the present invention, there is provided a rollover determination apparatus for vehicles including: a roll angular velocity detecting unit for detecting, as a roll angular velocity, a rotational angular velocity of a vehicle about a longitudinal axis extending lengthwise through the vehicle; an upward-or-downward-acceleration detecting unit for detecting, as an upward or downward acceleration, an acceleration in an upward or downward direction of the vehicle; an arithmetic processing unit for carrying out arithmetic processing on both the roll angular velocity detected by the roll angular velocity detecting unit and the upward or downward acceleration detected by the upward-or-downward-acceleration detecting unit; and a rollover occurrence determining unit for determining whether the vehicle will roll over based on a processing result of the arithmetic processing unit.

Therefore, since the rollover determination apparatus in accordance with the present invention determines whether the vehicle will roll over by using at least the roll angular velocity of the vehicle about the longitudinal axis extending lengthwise through the vehicle and the upward or downward acceleration in the upward or downward direction of the vehicle, the rollover determination apparatus can distinguish between side crashes and rollover accidents more correctly and can finely determine whether the vehicle will roll over with a higher degree of reliability even when a rollover accident accompanied by a large lateral acceleration occurs. In addition, the structure of the rollover determination apparatus in accordance with the present invention can be simplified.

Further objects and advantages of the present invention will be apparent from the following description of the preferred embodiments of the invention as illustrated in the accompanying drawings.

DETAILED DESCRIPTION OF THE PREFERRED EMBODIMENTS

The preferred embodiments of the present invention will be now described with reference to the accompanying drawings.

Embodiment 1.

Figure 1:
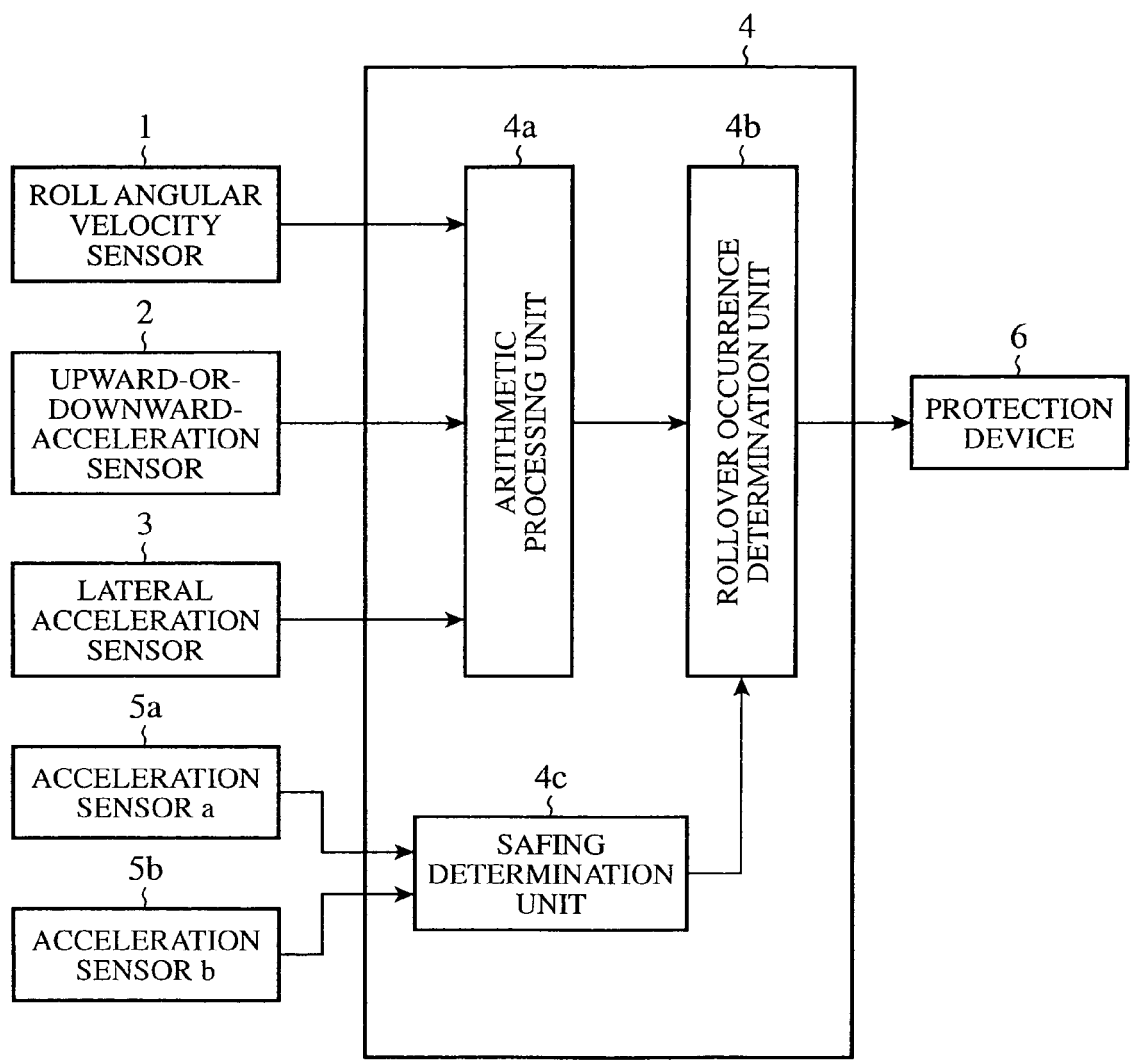
FIG. 1 is a functional block diagram showing the whole of a rollover determination apparatus for vehicles in accordance with embodiment 1 of the present invention.

FIG. 1 is a functional block diagram showing the whole of a rollover determination apparatus for vehicles in accordance with embodiment 1 of the present invention. As shown in FIG. 1, a determination unit is provided with a roll angular velocity sensor 1 provided as a roll angular velocity detecting means, for detecting, as a roll angular velocity, a rotational angular velocity (i.e., a roll rate) of a vehicle about a longitudinal axis extending lengthwise through the vehicle, an upward-or-downward-acceleration sensor 2 provided as an upward-or-downward-acceleration detecting means, for detecting, as an upward or downward acceleration, an acceleration of the vehicle in an upward or downward direction of the vehicle, and a lateral acceleration sensor 3 provided as a lateral acceleration detecting means, for detecting, as a lateral acceleration, an acceleration of the vehicle in a lateral direction of the vehicle, on an input side thereof.

The determination unit 4 performs arithmetic processing on the roll angular velocity of the vehicle detected by the roll angular velocity sensor 1, the upward or downward acceleration of the vehicle detected by the upward-or-downward-acceleration sensor 2, and the lateral acceleration of the vehicle detected by the lateral acceleration sensor 3. The determination unit 4 is provided with an arithmetic processing unit 4a for creating at least one rollover determination value used for determination of whether the vehicle will roll over, a rollover occurrence determining unit 4b for performing evaluation processing on at least the one rollover determination value which is an operation result of the arithmetic processing unit 4a by using a rollover determination threshold map, and for determining whether the vehicle will roll over, and a safing determining unit 4c for determining the amount of acceleration of the body of the vehicle based on the lateral acceleration detected by the lateral acceleration sensor 5a for detection of side crash, and for determining the tilt angle of the body of the vehicle based on the lateral acceleration detected by the lateral acceleration sensor 5b for detection of tilt angle. The rollover occurrence determining unit 4b has stored the rollover determination threshold map in a storage means (not shown) beforehand. As a method of determining whether the vehicle will roll over, the rollover occurrence determining unit 4b in accordance with this embodiment 1 uses multiplication determination equations, as mentioned below. As an alternative, the rollover occurrence determining unit 4b can use addition determination equations or both of multiplication determination equations and addition determination equations, as will be mentioned in embodiments 2 and 3.

The rollover occurrence determining unit 4b furnishes, as a start signal, its output indicating a result of determination of whether the vehicle will roll over to a protection device 6 including a side air bag apparatus disposed outside the determination unit 4. As result, when the determination unit 4 determines that the vehicle will roll over, the protection device 6 can develop air bags so as to provide protection for the vehicle's occupants.

Figure 2:
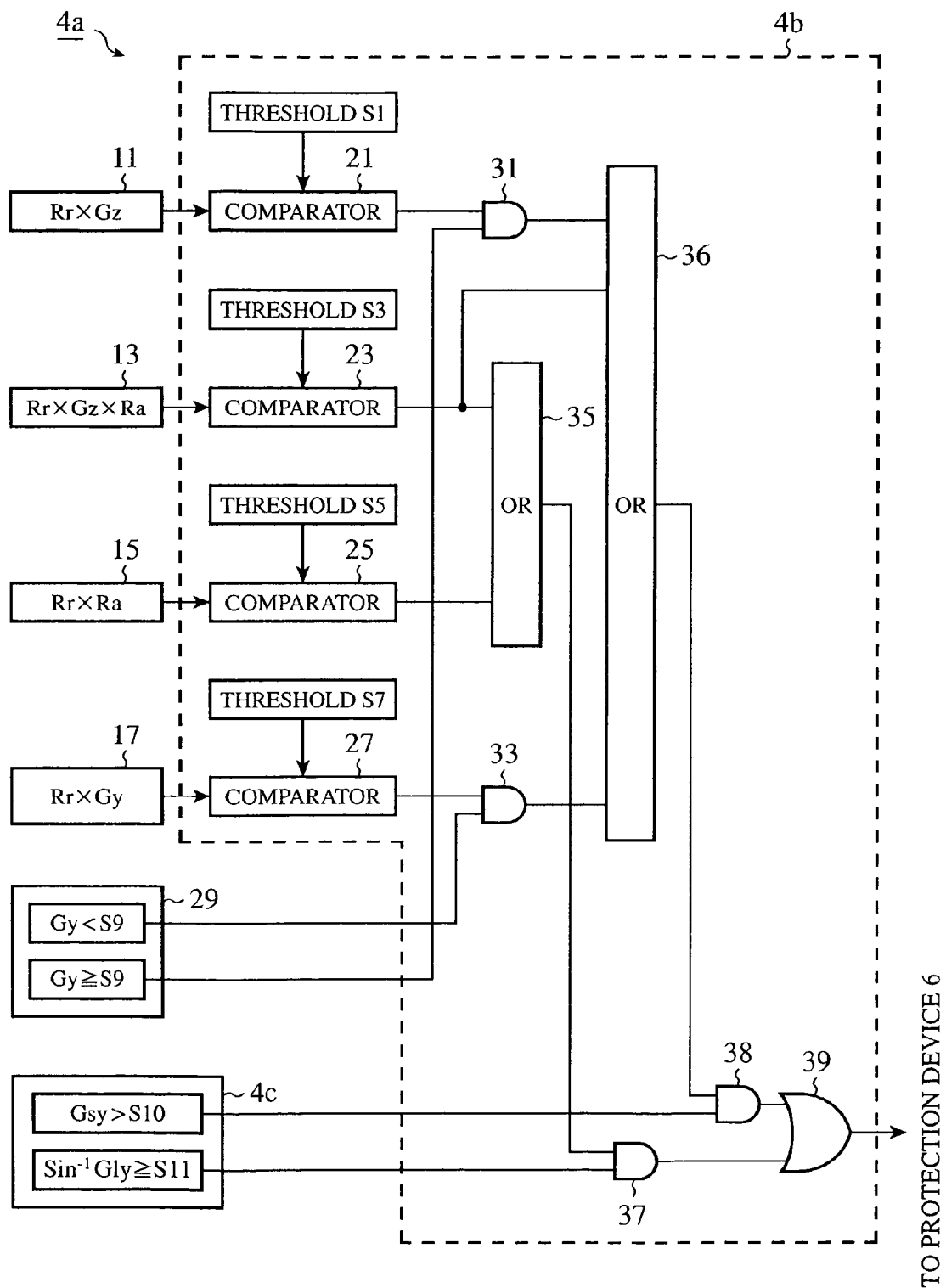
FIG. 2 is a functional block diagram showing a part of the rollover determination apparatus for vehicles in accordance with embodiment 1 of the present invention.

FIG. 2 is a functional block diagram showing an example of the internal structure of the determination unit 4, and shows a case where multiplication determination equations are used as the rollover determination equations. The determination unit 4 is provided with a first multiplication unit 11 for carrying out multiplication of the roll angular velocity Rr of the vehicle detected by the roll angular velocity sensor 1 and the upward or downward acceleration Gz of the vehicle detected by the upward-or-downward-acceleration sensor 2, a second multiplication unit 13 for carrying out multiplication of the product of the roll angular velocity Rr and the upward or downward acceleration Gz and the below-mentioned roll angle Ra of the vehicle, a third multiplication unit 15 for carrying out multiplication of the roll angular velocity Rr and the roll angle Ra, and a fourth multiplication unit 17 for carrying out multiplication of the roll angular velocity Rr and the lateral acceleration Gy of the vehicle detected by the lateral acceleration sensor 3, on an input side thereof.

A first comparator 21 compares the multiplication result obtained by the first multiplication unit 11 with a first threshold S1, a second comparator 23 similarly compares the multiplication result obtained by the second multiplication unit 13 with a second threshold S3, a third comparator 25 similarly compares the multiplication result obtained by the third multiplication unit 15 with a third threshold S5, and a fourth comparator 27 similarly compares the multiplication result obtained by the fourth multiplication unit 17 with a fourth threshold S7.

The determination unit 4 further includes a lateral acceleration determination unit 29 for determining the amount of the lateral acceleration detected by the lateral acceleration sensor 3, and for outputting its determination result, as a trigger signal, to first and second AND gates 31 and 33. The lateral acceleration determination unit 29 accepts the lateral acceleration Gy of the vehicle from the lateral acceleration sensor 3. When this lateral acceleration Gy is equal to or larger than a fifth predetermined threshold S9 (i.e., Gy>=S9), the lateral acceleration determination unit 29 outputs a trigger signal having a value of "1" to one input terminal of the first AND gate 31 connected to an output terminal of the first comparator 21. On the other hand, when the lateral acceleration Gy is smaller than the fifth threshold S9 (i.e., Gy<S9), the lateral acceleration determination unit 29 outputs a trigger signal having a value of "1" to one input terminal of the second AND gate 33 connected to an output terminal of the fourth comparator 27.

The output terminal of the first comparator 21 is connected to another input terminal of the first AND gate 31, and the output terminal of the fourth comparator 27 is similarly connected to another input terminal of the second AND gate 33. The second and third comparators 23 and 25 have output terminals connected to two input terminals of a first OR gate 35, respectively, and the output terminal of the second comparator 23 is further connected to an input terminal of a second OR gate 36. The first and second AND gates 31 and 33 have output terminals connected to other input terminals of the second OR gate 36, respectively.

The first and second OR gates 35 and 36 have output terminals connected to input terminals of third and fourth AND gates 37 and 38, respectively, and these third and fourth AND gates 37 and 38 have other input terminals connected to output terminals of the safing determining unit 4c, respectively. This safing determining unit 4c has a safing function of using an acceleration signal for detection of side crash (i.e., high Gy) at the time of determination of whether the product of the roll angular velocity Rr and the upward or downward acceleration Gz is larger than the corresponding threshold, and another safing function of using an acceleration signal for detection of tilt angle (i.e., low Gy) at the time of determination of whether the product of the roll angular velocity Rr and the roll angle Ra is larger than the corresponding threshold. In other words, when the lateral acceleration Gsy of the vehicle detected by the lateral acceleration sensor $5a$ for detection of side crash exceeds a predetermined value S10, the safing determining unit $4c$ furnishes a trigger signal having a value of "1" to the other input terminal of the fourth AND gate 38. On the other hand, when the tilt angle of the vehicle obtained by carrying out angle conversion on a low-frequency component of the output of the lateral acceleration sensor $5b$ for detection of tilt angle is larger than a predetermined value S11, the safing determining unit $4c$ furnishes a trigger signal having a value of "1" to the other input terminal of the third AND gate 37.

A third OR gate 39 for implementing a logical OR operation on the outputs of the third and fourth AND gates 37 and 38 has input terminals respectively connected to the output terminals of the third and fourth AND gates 37 and 38. An output of the third OR gate 39 is furnished to the protection device 6 (see FIG. 1). In accordance with this embodiment, the first through fourth multiplication units 11, 13, 15, and 17 substantially constitute the arithmetic processing unit $4a$, and the first through fourth comparators 21, 23, 25, and 27, the lateral acceleration determination unit 29, the first through fourth AND gates 31, 33, 37, and 38, and the first through third OR gates 35, 36, and 39 substantially constitute the rollover occurrence determining unit $4b$.

Figure 3:
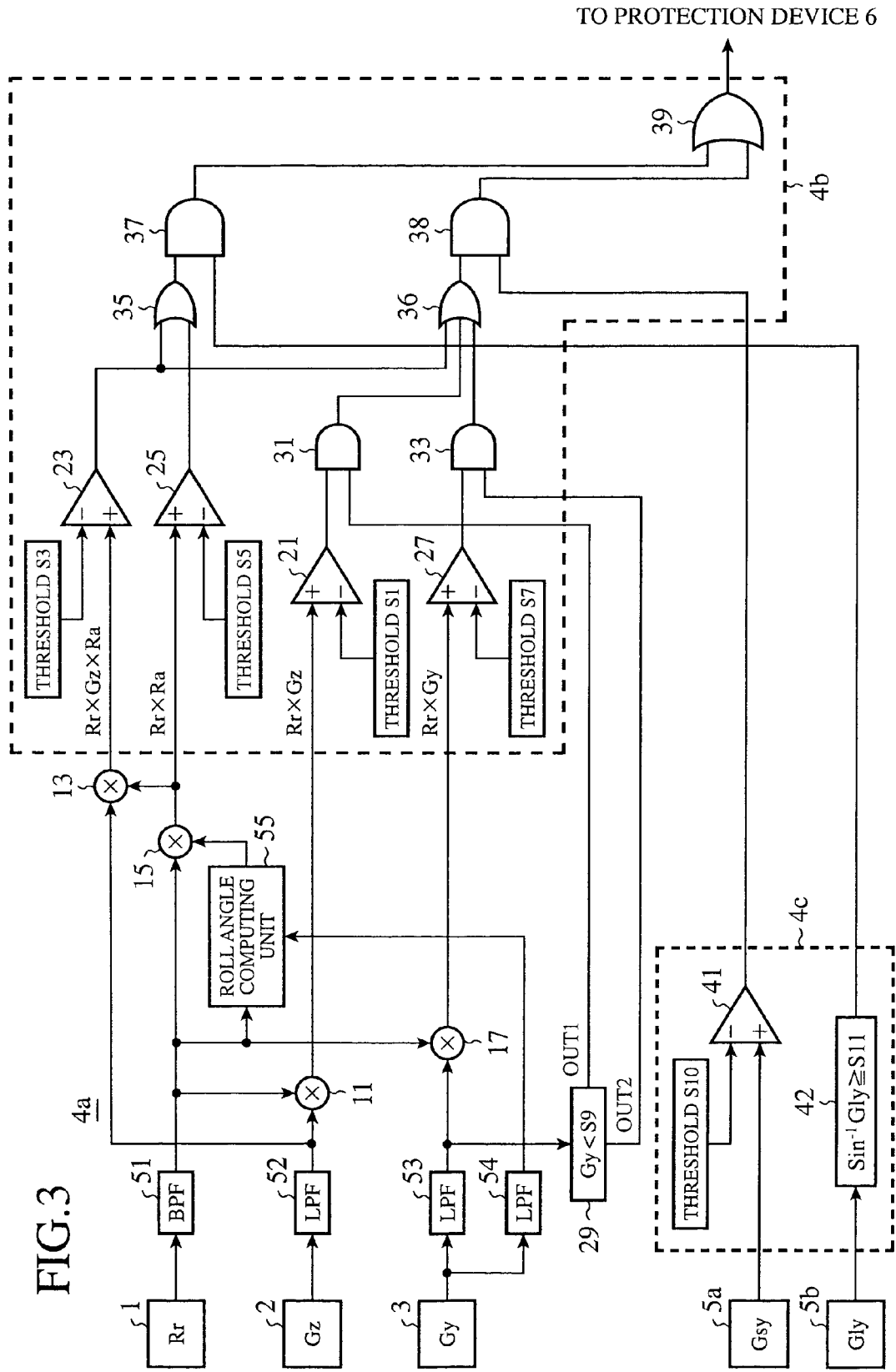
FIG. 3 is a circuit diagram showing an example of the rollover determination apparatus for vehicles in accordance with embodiment 1 of the present invention.

FIG. 3 is a circuit diagram showing a concrete example of the internal structure of the determination unit 4 as shown in FIG. 2. In FIG. 3, the same components as shown in FIG. 2 are designated by the same reference numerals as shown in FIG. 2. In the figure, the roll angular velocity sensor 1 has an output terminal which is connected to one input terminal of the first multiplication unit 11 via a band pass filter (BPF) 51, and the upward-or-downward-acceleration sensor 2 has an output terminal which is connected to the other input terminal of the first multiplication unit 11 via a low pass filter (LPF) 52. The first multiplication unit 11 has an output terminal connected to one input terminal (i.e., the positive terminal) of the first comparator 21, and the first threshold S1 is applied to the other input terminal (i.e., the negative terminal) of the first comparator 21. The first comparator 21 is so constructed as to output a result of determination of whether or not Rr×Gz that is the product of the roll angular velocity Rr from the roll angular velocity sensor 1 and the upward or downward acceleration Gz from the upward-or-downward-acceleration sensor 2 is larger than the first threshold S1.

The band pass filter (BPF) 51 has an output terminal connected to one input terminal of the second multiplication unit 15, and is also connected to the other input terminal of the second multiplication unit 15 via a roll angle computing unit 55 for computing the roll angle Ra from the roll angular velocity Rr, as mentioned later. The second multiplication unit 15 has an output terminal connected to one input terminal of the first multiplication unit 13, and the low pass filter 52 has an output terminal connected to the other input terminal of the first multiplication unit 13. Furthermore, the first multiplication unit 13 has an output terminal connected to one input terminal (i.e., the positive terminal) of the second comparator 23, and the second threshold S3 is applied to the other input terminal (i.e., the negative terminal) of the second comparator 23. The second comparator 23 is so constructed as to output a result of determination of whether or not Rr×Gz×Ra that is the product of the roll angular velocity Rr, the upward or downward acceleration Gz, and the roll angle Ra is larger than the second threshold S3.

The second multiplication unit 15 has an output terminal connected to one input terminal (i.e., the positive terminal) of the third comparator 25, and the third threshold S5 is applied to the other input terminal (i.e., the negative terminal) of the third comparator 25. The third comparator 25 is so constructed as to output a result of determination of whether or not Rr×Ra that is the product of the roll angular velocity Rr and the roll angle Ra is larger than the third threshold S5.

The lateral acceleration sensor 3 has an output terminal connected to one input terminal of the fourth multiplication unit 17 via a low pass filter (LPF) 53, and the output terminal of the roll angular velocity sensor 1 is also connected to the other input terminal of the fourth multiplication unit 17 via the band pass filter 51. The fourth multiplication unit 17 has an output terminal connected to one input terminal (i.e., the positive terminal) of the fourth comparator 27, and the fourth threshold S7 is applied to the other input terminal (i.e., the negative terminal) of the fourth comparator 27. The fourth comparator 27 is so constructed as to output a result of determination of whether or not Rr×Gy that is the product of the roll angular velocity Rr and the lateral acceleration Gy from the lateral acceleration sensor 3 is larger than the fourth threshold S7.

A low pass filter (LPF) 54 is also connected to the output terminal of the lateral acceleration sensor 3, and an output of the lowpass filter 54 is furnished to the roll angle computing unit 55 so that the roll angle computing unit 55 computes the tilt angle (i.e., the roll angle Ra) of the vehicle. The output terminal of the lateral acceleration sensor 3 is also connected to an input terminal of the lateral acceleration determination unit 29 via the low pass filter (LPF) 53. The lateral acceleration determination unit 29 has a first output terminal OUT1 connected to the input terminal of the first AND gate 31, and a second output terminal OUT2 connected to the input terminal of the second AND gate 33. The lateral acceleration determination unit 29 accepts the lateral acceleration Gy from the lateral acceleration sensor 3. When this lateral acceleration Gy is equal to or larger than the fifth predetermined threshold S9 (i.e., Gy>=S9), the lateral acceleration determination unit 29 outputs a trigger signal having a value of "1" to the input terminal of the first AND gate 31 via the first output terminal OUT1 thereof. On the other hand, when the lateral acceleration Gy is smaller than the fifth threshold S9 (i.e., Gy<S9), the lateral acceleration determination unit 29 outputs a trigger signal having a value of "1" to the input terminal of the second AND gate 33 via the second output terminal OUT2 thereof.

The safing determining unit $4c$ is provided with a comparator 41 that is used when it is determined that the vehicle will roll over based on the lateral acceleration Gy (or the upward or downward acceleration Gz) and the roll angular velocity Rr, and a tilt-angle determination unit 42 that is used when it is determined that the vehicle will roll over based on the roll angular velocity Rr and the roll angle Ra. The comparator 41 has an input terminal (i.e., the positive terminal) connected to the lateral acceleration sensor $5a$ for detection of side crash, another input terminal (i.e., the negative terminal) to which the threshold S10 is applied, and an output terminal connected to the other input terminal of the fourth AND gate 38. When the lateral acceleration detected by the first lateral acceleration sensor $5a$ for detection of side crash exceeds the predetermined value S10, the comparator 41 furnishes a trigger signal having a value of "1" to the other input terminal of the fourth AND gate 38.

The tilt-angle determination unit 42 has an input terminal connected to the second lateral acceleration sensor $5b$ for detection of tilt angle and an output terminal connected to the other input terminal of the third AND gate 37. When the tilt angle of the vehicle which the tilt-angle determination unit 42 obtains by carrying out angle conversion on a low-frequency component of the output of the lateral acceleration sensor 5b for detection of tilt angle is equal to or larger than the predetermined value S11, the tilt-angle determination unit 42 furnishes a trigger signal having a value of "1" to the other input terminal of the third AND gate 37. The determination thresholds S1, S3, S5, and S7 for Rr×Gz, Rr×Gz×Ra, Rr×Gy, and Rr×Gy can be pre-stored in a storage means (not shown) as elements which substantially constitute the rollover determination threshold map.

Next, the operation of the rollover determination apparatus in accordance with embodiment 1 will be explained with reference to FIGS. 4 to 6. In step ST1, the arithmetic processing unit 4a of the determination unit 4 receives the roll angular velocity Rr of the vehicle about a longitudinal axis extending lengthwise through the vehicle, which is detected by the roll angular velocity sensor 1, the upward or downward acceleration Gz of the vehicle in the upward or downward direction of the vehicle, which is detected by the upward-or-downward-acceleration sensor 2, and the lateral acceleration Gy of the vehicle in the lateral direction of the vehicle, which is detected by the lateral acceleration sensor 3, and the safing determining unit 4c of the determination unit 4 receives the lateral acceleration Gsy at a time of occurrence of side crash, which is detected by the lateral acceleration sensor 5a for detection of side crash.

In step ST2, the roll angle computing unit 55 of the arithmetic processing unit 4a computes the roll angle Ra of the vehicle from the roll angular velocity Rr of the vehicle detected by the roll angular velocity sensor 1, which is inputted thereto via the band pass filter 51, and the lateral acceleration Gy of the vehicle detected by the lateral acceleration sensor 3.

Next, a method of computing the roll angle Ra which the roll angle computing unit 55 uses will be explained in detail with reference to FIG. 5. When receiving the roll angular velocity Rr from the roll angular velocity sensor 1 in step ST21, the roll angle computing unit 55, in step ST22, determines whether or not the roll angular velocity Rr is equal to or smaller than a predetermined value S12, and, if so, further determines whether this state lasts for a predetermined time period T1. In other words, the roll angle computing unit 55 determines whether a state in which the roll angular velocity Rr is equal to or smaller than 10 degrees/s lasts for T1 seconds, for example. Since the vehicle can be assumed to be held in a stable state if this condition is satisfied, the roll angle computing unit 55, in step ST23, computes the roll angle Ra (Ra=Sin$^{-1}$Gy) from the lateral acceleration Gy inputted thereto, via the low pass filter 54, from the lateral acceleration sensor 3. In other words, by carrying out an angle operation on a DC component of the lateral acceleration Gy from the lateral acceleration sensor 3, the roll angle computing unit 55 computes the roll angle Ra of the vehicle and substantially sets this computed roll angle to a reference angle Ras, and, in step ST24, outputs the computed roll angle Ra to the second multiplication unit 15.

On the other hand, when, in step ST22, determining that the condition that the roll angular velocity Rr is equal to or smaller than the predetermined value S12 and this state lasts for a predetermined time period T1 is not satisfied, the roll angle computing unit 55, in step ST25, performs integrating processing on the roll angular velocity Rr (or Rr-S12) so as to determine the roll angle Ra. The roll angle computing unit 55 then, in step ST26, adds the previously-obtained reference angle Ras to this determined roll angle Ra and, in step ST24, outputs the addition result, as the roll angle Ra, to the second multiplication unit 15. In other words, since steps ST25 and 26 are carried out in a case where the roll angular velocity Rr occurs, the roll angle computing unit 55 computes the tilt angle of the vehicle by adding the integral of the output of the roll acceleration sensor 1 which has been evaluated since the angular velocity started occurring to the roll angle of the vehicle which was detected by the lateral-acceleration sensor 3 immediately before the angular velocity started occurring. As a result, the angle computing unit 55 can fix errors of the computed angle due to an offset drift of the angular velocity sensor.

Figure 4:
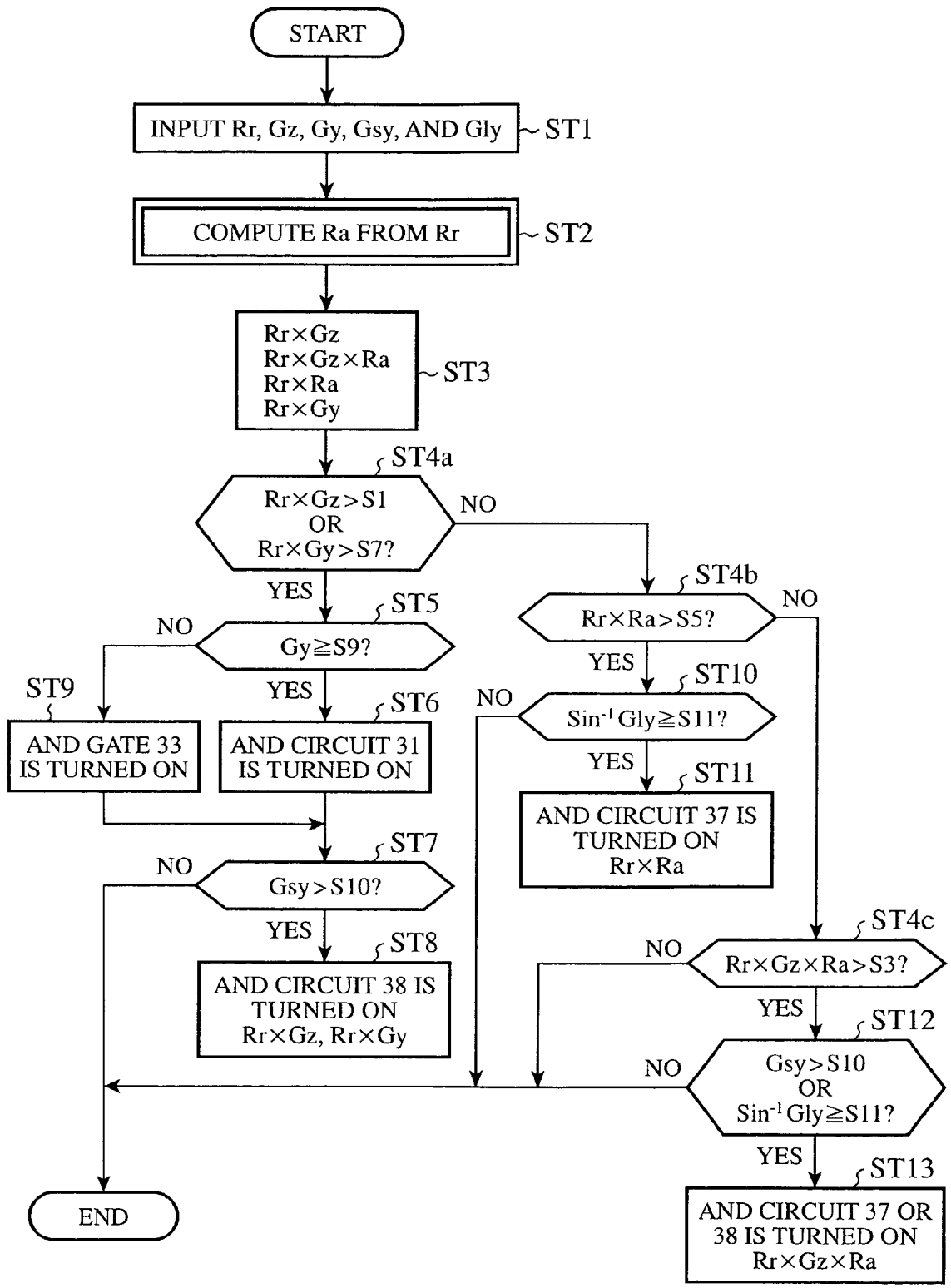
FIG. 4 is a flow chart for explaining the operation of the rollover determination apparatus for vehicles in accordance with embodiment 1 of the present invention.
Figure 5:
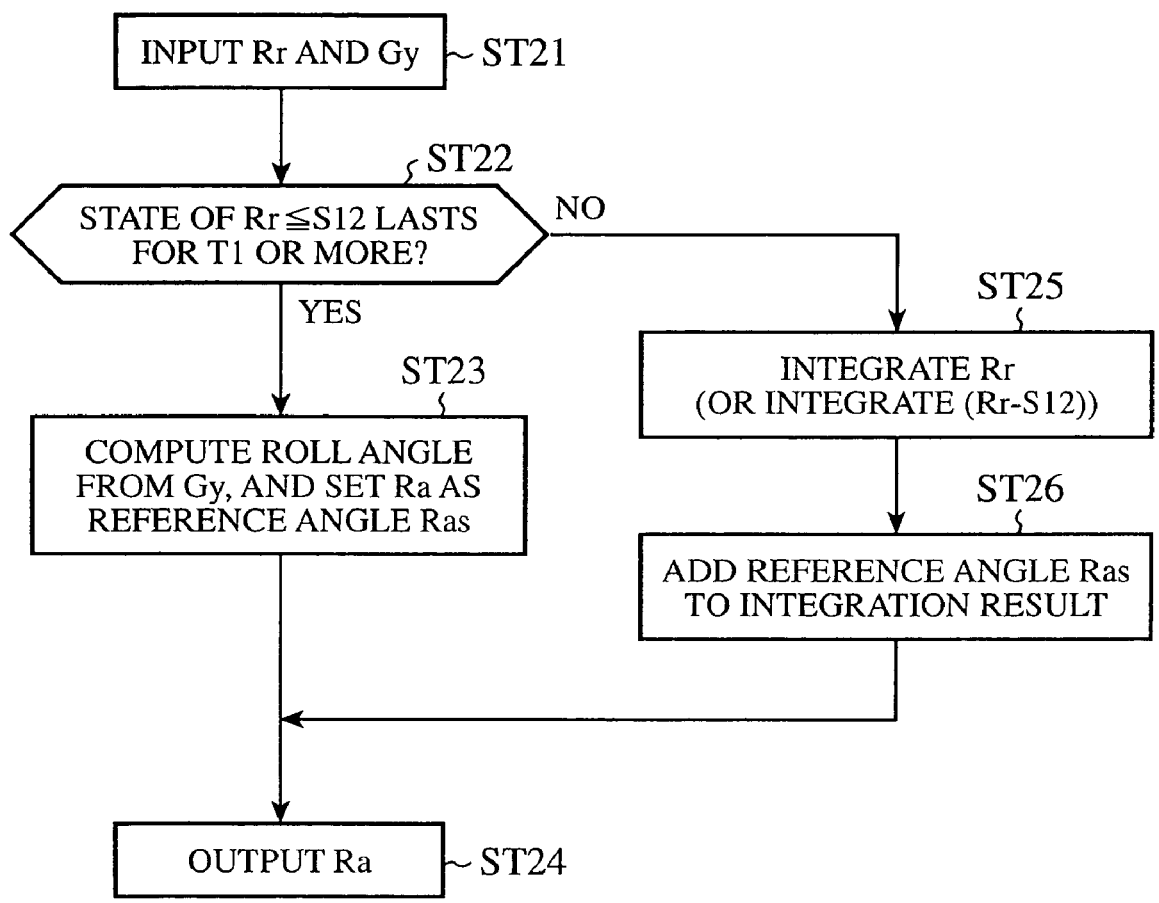
FIG. 5 is the flow chart for explaining a part of the operation of the rollover determination apparatus for vehicles in accordance with embodiment 1 of the present invention in detail.

The rollover determination apparatus then returns to the flow of FIG. 4, and, in step ST3, carries out multiplication of the roll angular velocity Rr from the roll angular velocity sensor 1 and the upward or downward acceleration Gz from the upward-or-downward-acceleration sensor 2 by using the first multiplication unit 11, carries out multiplication of the roll angular velocity Rr, the upward or downward acceleration Gz, and the above-mentioned roll angle Ra by using the second multiplication unit 13, carries out multiplication of the roll angular velocity Rr and the roll angle Ra by using the third multiplication unit 15, carries out multiplication of the roll angular velocity Rr and the lateral acceleration Gy from the lateral acceleration sensor 3 by using the fourth multiplication unit 17, and sends these multiplication results to the rollover occurrence determining unit 4b.

The rollover determination apparatus then, in step ST4a, compares the product of the roll angular velocity Rr and the upward or downward acceleration Gz with the first threshold S1 by using the first comparator 21, and also compares the product of the roll angular velocity Rr and the lateral acceleration Gy with the fourth threshold S7 by using the fourth comparator 27. The rollover determination apparatus further, in step ST4b, compares the product of the roll angular velocity Rr and the roll angle Ra with the third threshold S5 by using the third comparator 25, and also, in step ST4c, compares the product of the roll angular velocity Rr, the upward or downward acceleration Gz, and the roll angle Ra with the second threshold S3 by using the second comparator 23. In performing either of steps ST4a to ST4c, when the product is larger than the corresponding threshold, the corresponding comparator outputs a signal having a value of "1" as its threshold determination result.

When either one of the first and fourth comparators 21 and 27, in step ST4a, outputs a signal having a value of "1", the lateral acceleration determination unit 29, in step ST5, determines whether the lateral acceleration Gy is equal to or larger than the predetermined value S9. When determining that the lateral acceleration Gy is equal to or larger than the predetermined value S9, the rollover determination apparatus, in step ST6, sends a trigger signal having a value of "1" from the lateral acceleration determination unit 29, as well as the threshold determination result indicating whether or not Rr×Gz is larger than the first threshold S1, to the first AND gate 31. The rollover determination apparatus then, in step ST7, inputs the lateral acceleration Gsy at a time of side crash, which is detected by the lateral acceleration sensor 5a for detection of side crash, to the safing determining unit 4c thereof, and determines whether or not the lateral acceleration Gsy is larger than the predetermined value S10 by using the comparator 41. When determining that the lateral acceleration Gsy is larger than the predetermined value S10, the rollover determination apparatus, instep ST8, furnishes a determination result having a value of "1" of the comparator 41, as well as the output having a value of "1" of the first AND gate 31, to the fourth AND gate 38, and the fourth AND gate 38 therefore outputs its output signal having a value of "1", by way of the third OR gate 39, to the protection device 6 as a driving signal associated with RrxGz, if the first comparator 21 outputs a signal having a value of "1" or RrxGz is larger than the first threshold S1.

On the other hand, when, in step ST5, determining that the lateral acceleration Gy is not equal to or larger than the predetermined value S9, the rollover determination apparatus, in step ST9, sends a trigger signal having a value of "1" from the lateral acceleration determination unit 29, as well as the threshold determination result indicating whether or not RrxGy is larger than the second threshold S7, to the second AND gate 33. After that, as in the case of the determination of whether or not RrxGz is larger than the first threshold S1, the rollover determination apparatus, in step ST7, determines whether or not the lateral acceleration Gsy is larger than the predetermined value S10 by using the comparator 41. When then determining that the lateral acceleration Gsy is larger than the predetermined value S10, the rollover determination apparatus, in step ST8, furnishes a determination result having a value of "1" of the comparator 41, as well as the output having a value of "1" of the second AND gate 33, to the fourth AND gate 38, and the fourth AND gate 38 therefore outputs its output signal having a value of "1", by way of the third OR gate 39, to the protection device 6 as a driving signal associated with RrxGy, if the fourth comparator 27 outputs a signal having a value of "1" or RrxGy is larger than the fourth threshold S7.

When the third comparator 25, in step ST4b, outputs a signal having a value of "1", the rollover determination apparatus, in step ST10, inputs the lateral acceleration Gly detected by the lateral acceleration sensor 5b for detection of tilt angle to the safing determining unit 4c thereof, and determines whether or not the tilt angle ($Sin^{-1}$Gly) computed based on the low-frequency component of the lateral acceleration Gly is equal to or larger than the predetermined value S11, i.e., a fixed angle by using the tilt angle determination unit 42. When determining that the tilt angle is equal to or larger than the predetermined value S11, the rollover determination apparatus, in step ST11, furnishes a determination result having a value of "1" of the tilt angle determination unit 42, as a trigger signal, as well as the threshold determination result indicating that RrxRa is larger than the third threshold S5, to the third AND gate 37. The third AND gate 37 then outputs its output signal having a value of "1", by way of the third OR gate 39, to the protection device 6 as a driving signal associated with RrxRa.

When the second comparator 23, in step ST4c, outputs a signal having a value of "1", the rollover determination apparatus, in step ST12, determines whether or not the tilt angle ($Sin^{-1}$Gly) computed based on the low-frequency component of the lateral acceleration Gly is equal to or larger than the predetermined value S11 by using the tilt angle determination unit 42. When determining that the tilt angle is equal to or larger than the predetermined value S11, the rollover determination apparatus, in step ST13, furnishes the determination result of the tilt angle determination unit 42, as a trigger signal, as well as the threshold determination result indicating that RrxGzxRa is larger than the second threshold S3, to the third AND gate 37. The third AND gate 37 then outputs its output signal having a value of "1", by way of the third OR gate 39, to the protection device 6 as a driving signal associated with RrxGzxRa. When, in step ST12, determining that the tilt angle ($Sin^{-1}$Gly) computed is not equal to or larger than the predetermined value S11, the rollover determination apparatus further determines whether or not the lateral acceleration Gsy is larger than the predetermined value S10 by using the comparator 41. When determining that the lateral acceleration Gsy is larger than the predetermined value S10, the rollover determination apparatus, in step ST13, furnishes the determination result of the comparator 41, as a trigger signal, as well as the threshold determination result indicating that RrxGzxRa is larger than the second threshold S3, to the fourth AND gate 38. The fourth AND gate 38 then outputs its output signal having a value of "1", by way of the third OR gate 39, to the protection device 6 as a driving signal associated with RrxGzxRa.

Thus, when the rollover determination apparatus determines that the vehicle will roll over based on either the upward or downward acceleration Gz or the lateral acceleration Gy, the safing determining unit 4c activates the protection device 6 only if the acceleration Gsy detected for detection of side crash at the time of the determination of rollover is larger than the threshold S10. On the other hand, when the rollover determination apparatus determines that the vehicle will roll over based on the roll angle Ra, the safing determining unit 4c activates the protection device 6 only if the tilt angle ($Sin^{-1}$Gly) of the vehicle, which is computed from the low-frequency signal component of the lateral acceleration Gly for detection of tilt angle, is equal to or larger than the threshold S11. Alternatively, when the rollover determination apparatus determines that the vehicle will roll over based on both the upward or downward acceleration Gz and the roll angle Ra, the safing determining unit 4c activates the protection device 6 only if the acceleration Gsy detected for detection of side crash at the time of the determination of rollover is larger than the threshold S10 or the tilt angle ($Sin^{-1}$Gly) of the vehicle, which is computed from the low-frequency signal component of the lateral acceleration Gly for detection of tilt angle, is equal to or larger than the threshold S11. When performing rollover determination based on the lateral acceleration Gy and the roll angular velocity Rr, the rollover determination apparatus can similarly use the safing determination used for the rollover determination based with the upward or downward acceleration Gz and the roll angular velocity Rr. The lateral acceleration sensor 3 for detecting the lateral acceleration Gy of the vehicle has substantially the same performance as the acceleration sensor 5a for detecting the acceleration Gsy for detection of side crash of the vehicle. When not selecting the determination result associated with Gy, the safing determining unit 4c can use the lateral acceleration Gy of the vehicle detected by the lateral acceleration sensor 3 instead of the acceleration Gsy for detection of side crash.

There are some types of rollover accidents which can occur in a vehicle, including a rollover accident accompanied by a small lateral acceleration Gy and a large roll angular velocity Rr, which can occur when a wheel of the vehicle falls into a ditch or the like, for example, while the vehicle is traveling, a turnover accident accompanied by a lateral acceleration Gy and a roll angle Ra being substantially in proportion to with each other, which can occur because of the friction between the road surface and the tires when the vehicle rapidly makes a turn, a flipover accident accompanied by a small lateral acceleration Gy throughout the occurrence of the rollover accident and a large roll angle Ra, which can occur when a wheel of the vehicle gets on an obstacle or a slope, for example, while the vehicle is traveling, a tripover accident accompanied by a large lateral acceleration Gy, a small roll angle Ra, and a large roll angular velocity Rr at a time when the rollover accident starts occurring, which can occur when a force due to collision with a curbstone or the like is exerted upon the vehicle while the vehicle is sliding, a bounceover accident which can occur when the vehicle collides with an obstacle while the vehicle is traveling, and a climbover accident accompanied by a small lateral acceleration Gy, which can occur when the vehicle gets on a projecting object, gets over it, and turns over.

Figure 9A:
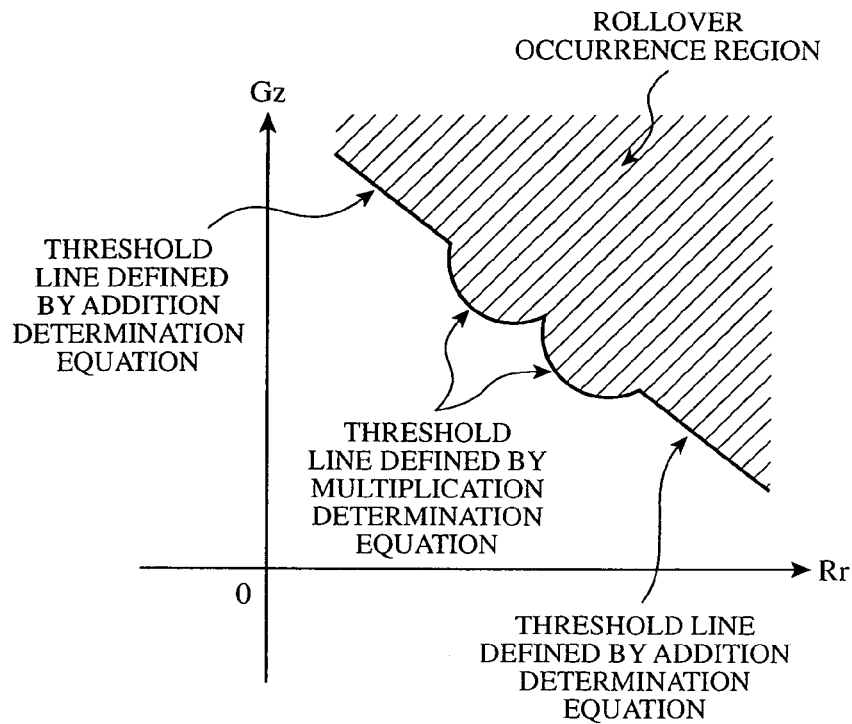
FIGS. 9A and 9B are diagrams each showing the shape of a threshold line included in an example of a rollover determination map which a rollover determination apparatus for vehicles in accordance with the present invention uses.
Figure 9B:
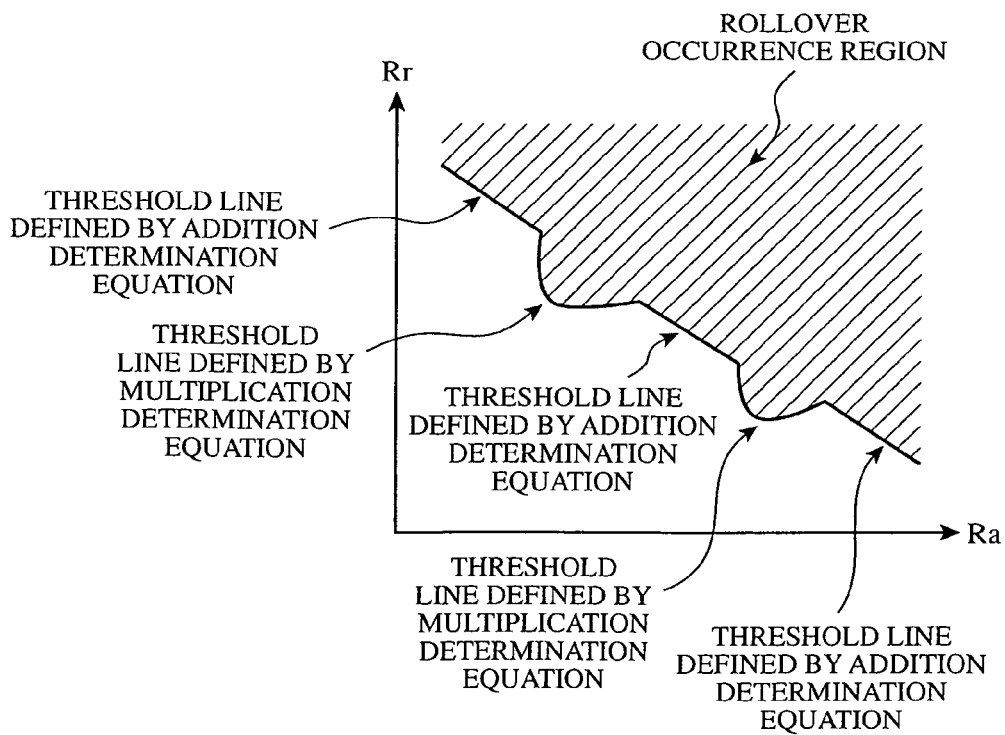

A rollover determination threshold map using the above-mentioned determination thresholds can be provided for determination of each of these types of rollover accidents. In this case, a determination threshold defined for the product of some parameters corresponds to a curved portion of the rollover determination threshold map. By using one or more of these determination thresholds, as shown in FIGS. 9A and 9B, the shape of one or more threshold lines in the rollover determination threshold map, which define a rollover occurrence region, can be determined freely and the one or more threshold lines can be drawn according to actual measurement data. The rollover determination threshold map has an advantage that even if the shape of the one or more threshold lines become complicated, each arithmetic processing itself does not become complicated.

Figure 6A:
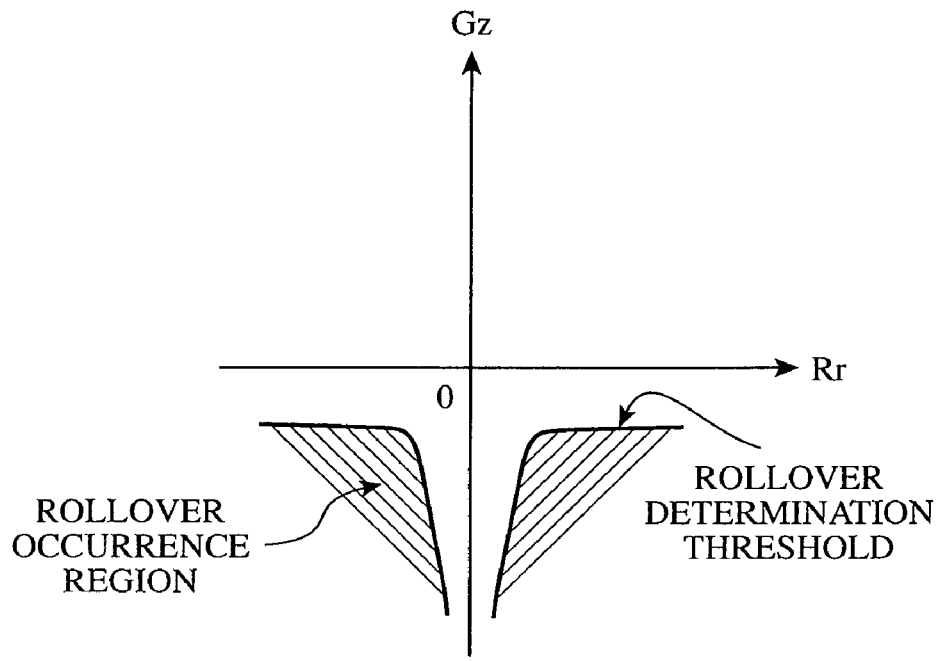
FIGS. 6A and 6B are diagrams each showing an example of a rollover determination threshold map which the rollover determination apparatus for vehicles in accordance with embodiment 1 of the present invention uses.

In a case where a tripover accident which is believed to have the highest probability of occurrence among the above-mentioned types of rollover accidents occurs with the lateral acceleration Gy and roll angular velocity Rr of the vehicle having peaks, and the vehicle starts rolling over and the roll angle Ra of the vehicle increases, since the time required for rollover determination apparatus to determine that the vehicle will roll over after the phenomenon has started is short in this tripover mode, determination using only the roll angle Ra is too late for the rollover determination apparatus to determine whether the vehicle will roll over. In general, in the event of a tripover accident, a prior art rollover determination apparatus determines whether the vehicle will roll over after detecting an acceleration which occurs in the vehicle because the vehicle partially has a crash. In contrast, in accordance with this embodiment, the rollover determination apparatus determines whether the vehicle will roll over by using a tripover determination map, as shown in FIG. 6A, in which rollover occurrence regions are defined using the upward or downward acceleration Gz and the roll angular velocity Rr, that is, by determining whether the point defined by both the upward or downward acceleration Gz and the roll angular velocity Rr is included in one of the rollover occurrence regions, as mentioned above.

In the event of a tripover accident, since the roll angular velocity Rr occurs in coincidence with the occurrence of the upward or downward acceleration Gz (that is, the lateral acceleration Gy rises and decreases at an earlier time than the upward or downward acceleration Gz and the roll angular velocity Rr), the rollover determination apparatus can determine whether the vehicle will roll over more precisely with a larger margin against requirements for turning off the determination of occurrence of rollover when using the upward or downward acceleration Gz and the roll angular velocity Rr, as compared with the case of the use of the lateral acceleration Gy and the roll angular velocity Rr.

Figure 6B:
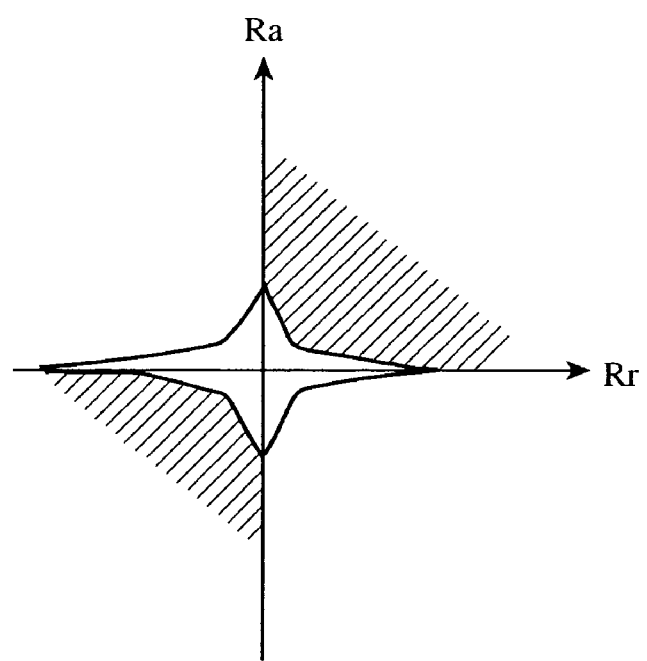

When a flipover (i.e., corkscrew) accident which is another type of rollover accident occurs, since a large acceleration does not occur in the vehicle and a phenomenon happens relatively quietly compared with tripover accidents, the rollover determination apparatus determines whether the vehicle will roll over by using a flipover determination map, as shown in FIG. 6B, in which rollover occurrence regions are defined using the roll angular velocity Rr and the roll angle Ra, that is, by determining whether the point defined by both the roll angular velocity Rr and the roll angle Ra is included in one of the rollover occurrence regions, as mentioned above. Therefore, the rollover determination apparatus can precisely determine whether the vehicle will roll over. As previously mentioned, the rollover determination apparatus determines whether the vehicle will roll over by using all the multiplication determination equations associated with Rr×Gz, Rr×Gz×Ra, Rr×Ra, and Rr×Gy. As an alternative, the rollover determination apparatus can determine whether the vehicle will roll over using arbitrary one or more multiplication determination equations which are selected from all the multiplication determination equations.

As mentioned above, the rollover determination apparatus in accordance with this embodiment 1 can determine whether the vehicle will roll over by using both the output of the angular velocity sensor and the output of the upward-or-downward-acceleration sensor and can use the upward or downward acceleration for the determination of whether the vehicle will roll over, instead of the lateral acceleration, in the event of a rollover accident accompanied by a large lateral acceleration. Therefore, the rollover determination apparatus in accordance with this embodiment 1 can distinguish between side crashes and rollover accidents more correctly and can determine whether the vehicle will roll over with a higher degree of accuracy. In addition, since the shape of one or more threshold lines in the rollover determination threshold map can be determined freely and the one or more threshold lines can be drawn according to actual measurement data, the rollover determination apparatus can be provided for a wide variety of uses and the measurement accuracy of the rollover determination apparatus can be improved.

Embodiment 2.

Figure 7:
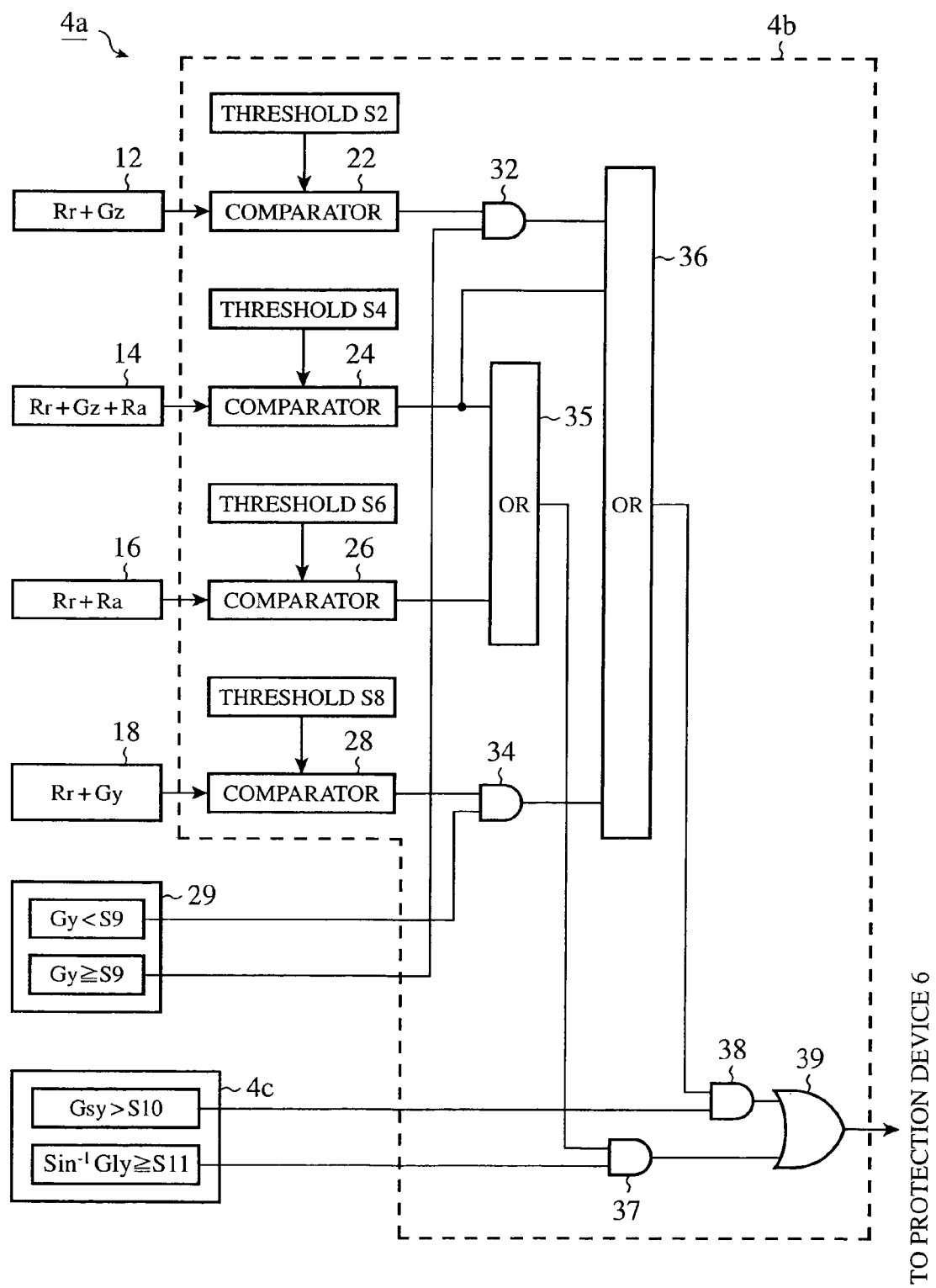
FIG. 7 is a functional block diagram showing a part of a rollover determination apparatus for vehicles in accordance with embodiment 2 of the present invention.

FIG. 7 shows an example of the internal structure of a determination unit of a rollover determination apparatus for vehicles in accordance with embodiment 2 of the present invention, and is a functional block diagram showing a case where addition determination equations are used as determination equations used for determining whether a vehicle will roll over. The determination unit 4 is provided with a first addition unit 12 for carrying out addition of the roll angular velocity Rr of the vehicle detected by a roll angular velocity sensor 1 and the upward or downward acceleration Gz of the vehicle detected by an upward-or-downward-acceleration sensor 2, a second addition unit 14 for carrying out addition of the roll angular velocity Rr, the upward or downward acceleration Gz, and the roll angle Ra of the vehicle, a third addition unit 16 for carrying out addition of the roll angular velocity Rr and the roll angle Ra, and a fourth addition unit 18 for carrying out addition of the roll angular velocity Rr and the lateral acceleration Gy of the vehicle detected by a lateral acceleration sensor 3, on an input side thereof. The rollover determination apparatus can compute the roll angle Ra which the second addition unit 14 uses by using the roll angular velocity Rr and the lateral acceleration Gy, like that of above-mentioned embodiment 1.

A first comparator 22 compares the additional result obtained by the first addition unit 12 with a first threshold S2, a second comparator 24 similarly compares the additional result obtained by the second addition unit 14 with a second threshold S4, a third comparator 26 similarly compares the additional result obtained by the third addition unit 16 with a third threshold S6, and a fourth comparator 28 similarly compares the additional result obtained by the fourth addition unit 18 with a fourth threshold S8.

A lateral acceleration determination unit 29 accepts the lateral acceleration Gy from the lateral acceleration sensor 3. When this lateral acceleration Gy is equal to or larger than a fifth predetermined threshold S9 (i.e., Gy>=S9), the lateral acceleration determination unit 29 outputs a trigger signal having a value of "1" to one input terminal of a first AND gate 32 connected to an output terminal of the first comparator 22. On the other hand, when the lateral acceleration Gy is smaller than the fifth threshold S9 (i.e., Gy<S9), the lateral acceleration determination unit 29 outputs the trigger signal having a value of "1" to one input terminal of a second AND gate 34 connected to an output terminal of the fourth comparator 28.

The output terminal of the first comparator 22 is connected to another input terminal of the first AND gate 32, and the output terminal of the fourth comparator 27 is similarly connected to another input terminal of the second AND gate 34. The second and third comparators 24 and 26 have output terminals connected to two input terminals of a first OR gate 35, respectively, and the output terminal of the second comparator 24 is further connected to an input terminal of a second OR gate 36.

The first and second AND gates 32 and 34 have output terminals connected to other input terminals of the second OR gate 36, respectively. The first and second OR gates 35 and 36 have output terminals connected to input terminals of third and fourth AND gates 37 and 38, respectively, and these third and fourth AND gates 37 and 38 have other input terminals connected to output terminals of a safing determining unit 4c, respectively.

When the lateral acceleration Gsy of the vehicle detected by a lateral acceleration sensor 5a for detection of side crash exceeds a predetermined value S10, the safing determining unit 4c furnishes a trigger signal having a value of "1" to the other input terminal of the fourth AND gate 38. On the other hand, when the tilt angle of the vehicle obtained by carrying out angle conversion on a low-frequency component of an output of a lateral acceleration sensor 5b for detection of tilt angle is equal to or larger than a predetermined value S11, the safing determining unit 4c furnishes a trigger signal having a value of "1" to the other input terminal of the third AND gate 37.

A third OR gate 39 for implementing a logical OR operation on the outputs of the third and fourth AND gates 37 and 38 has input terminals respectively connected to the output terminals of the third and fourth AND gates 37 and 38. An output of the third OR gate 39 is furnished to a protection device 6 (see FIG. 1). In accordance with this embodiment, the first through fourth addition units 12, 14, 16, and 18 substantially constitute an arithmetic processing unit 4a, and the first through fourth comparators 22, 24, 26, and 28 and the lateral acceleration determination unit 29, the first through fourth AND gates 31, 33, 37, and 38, and the first through third OR gates 35, 36, and 39 substantially constitute a rollover occurrence determining unit 4b.

The rollover determination apparatus in accordance with this embodiment operates in the same way as that according to above-mentioned embodiment 1, with the exception that it carries out addition processing instead of multiplication processing and determines whether the vehicle will roll over by using the addition determination equations associated with Rr+Gz, Rr+Gz+Ra, Rr+Ra, and Rr+Gy instead of the multiplication determination equations associated with Rr×Gz, Rr×Gz×Ra, Rr×Ra, and Rr×Gy. Therefore, the explanation of the same operation will be omitted hereafter. As in the case of the use of the multiplication determination equations, the lateral acceleration sensor 3 for detecting the lateral acceleration Gy of the vehicle has substantially the same performance as the acceleration sensor 5a for detecting the acceleration Gsy for detection of side crash of the vehicle. Therefore, when not selecting the determination result associated with Rr+Gy, the safing determining unit 4c can use the lateral acceleration Gy of the vehicle detected by the lateral acceleration sensor 3 instead of the acceleration Gsy for detection of side crash.

Even in this embodiment, a rollover determination threshold map using the above-mentioned determination thresholds can be provided for determination of these types of rollover accidents. In this case, a determination threshold defined for the sum of some parameters corresponds to a linear portion of the rollover determination threshold map. By using one or more of these determination thresholds, the shapes of threshold lines of the rollover determination threshold map can be determined freely and the threshold lines can be drawn according to actual measurement data. The rollover determination threshold map has an advantage that even if the shapes of the threshold lines become complicated, each arithmetic processing itself does not become complicated.

As mentioned above, this embodiment 2 offers the same advantage as provided by above-mentioned embodiment 1. When adding the roll angular velocity Rr and the upward or downward acceleration Gz, the first addition unit can assign a weight to the upward or downward acceleration Gz. Similarly, when adding the roll angular velocity Rr and the roll angle Ra, the third addition unit can assign a weight to the roll angle Ra. In other words, the first addition unit adds the upward or downward acceleration Gz to the roll angular velocity Rr after multiplying the upward or downward acceleration Gz by a coefficient K1, and then determines whether or not the addition result is larger than the corresponding threshold. Similarly, the third addition unit adds the roll angle Ra to the roll angular velocity Rr after multiplying the roll angle Ra by a coefficient K2, and then determines whether or not the addition result is larger than the corresponding threshold. As previously mentioned, the rollover determination apparatus determines whether the vehicle will roll over using all the addition determination equations associated with Rr+Gz, Rr+Gz+Ra, Rr+Ra, and Rr+Gy. As an alternative, the rollover determination apparatus determines whether the vehicle will roll over using arbitrary one or more addition determination equations which are selected from all the addition determination equations.

Embodiment 3.

Figure 8:
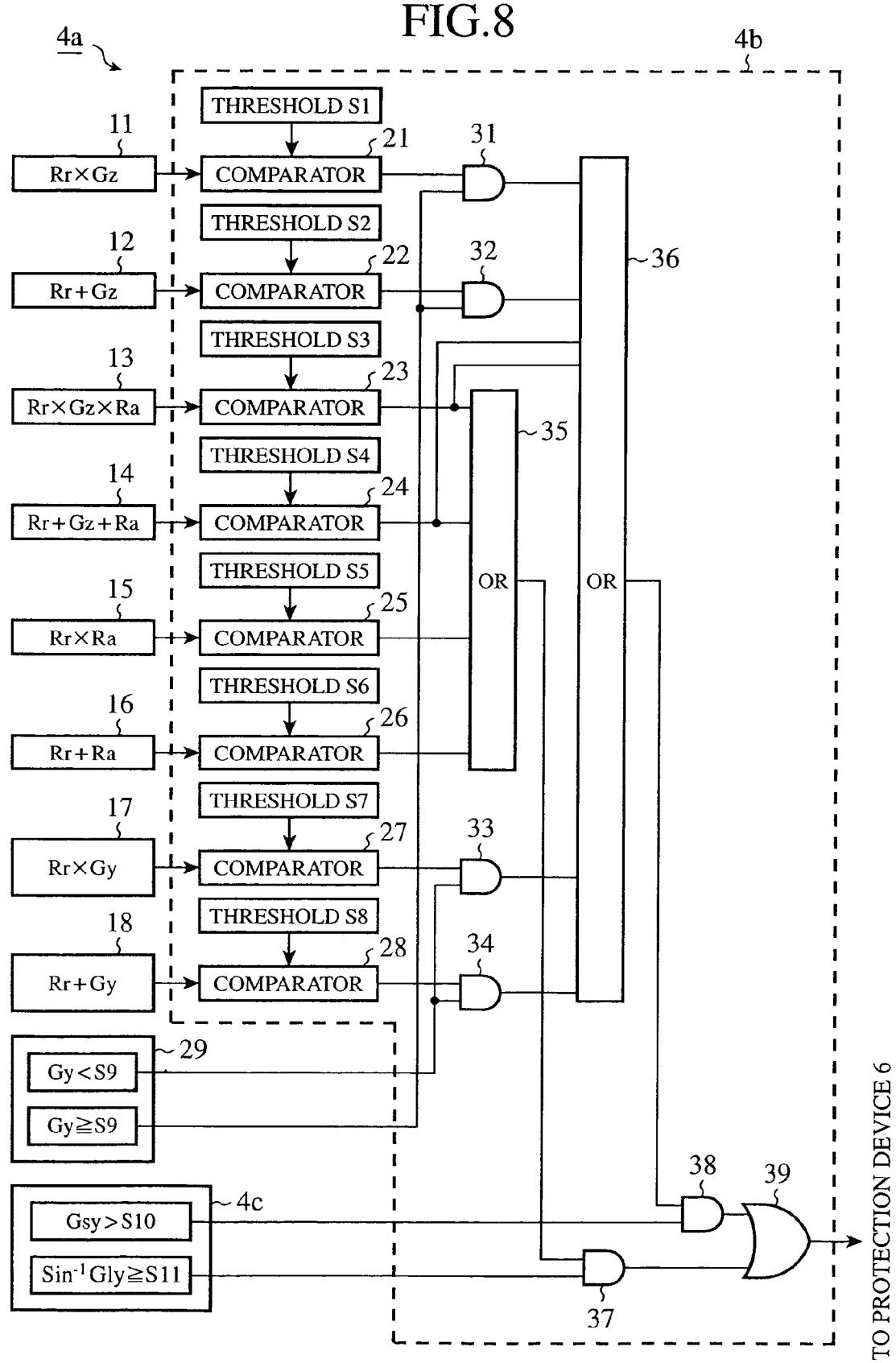
FIG. 8 is a functional block diagram showing a part of a rollover determination apparatus for vehicles in accordance with embodiment 2 of the present invention.

FIG. 8 shows an example of the internal structure of a determination unit of a rollover determination apparatus for vehicles in accordance with embodiment 3 of the present invention, and is a functional block diagram showing the determination unit which uses multiplication determination equations according to above-mentioned embodiment 1 and addition determination equations according to above-mentioned embodiment 2 as determination equations used for determining whether a vehicle will roll over. The determination unit 4 is provided with a first multiplication unit 11 for carrying out multiplication of the roll angular velocity Rr of the vehicle detected by a roll angular velocity sensor 1 and the upward or downward acceleration Gz of the vehicle detected by an upward-or-downward-acceleration sensor 2, a first addition unit 12 for carrying out addition of the roll angular velocity Rr and the upward or downward acceleration Gz, a second multiplication unit 13 for carrying out multiplication of the product of the roll angular velocity Rr and the upward or downward acceleration Gz and the roll angle Ra of the vehicle, a second addition unit 14 for carrying out addition of the roll angular velocity Rr, the upward or downward acceleration Gz, and the roll angle Ra, a third multiplication unit 15 for carrying out multiplication of the roll angular velocity Rr and the roll angle Ra, a third addition unit 16 for carrying out addition of the roll angular velocity Rr and the roll angle Ra, a fourth multiplication unit 17 for carrying out multiplication of the roll angular velocity Rr and the lateral acceleration Gy of the vehicle detected by a lateral acceleration sensor 3, and a fourth addition unit 18 for carrying out addition of the roll angular velocity Rr and the lateral acceleration Gy, on an input side thereof. Each of the fourth multiplication unit 17 and the fourth addition unit 18 can use the upward or downward acceleration Gz instead of the lateral acceleration Gy.

A first comparator 21 compares the multiplication result obtained by the first multiplication unit 11 with a first threshold S1, a second comparator 22 similarly compares the additional result obtained by the first addition unit 12 with a second threshold S2, a third comparator 23 similarly compares the multiplication result obtained by the second multiplication unit 13 with a third threshold S3, a fourth comparator 24 similarly compares the additional result obtained by the second addition unit 14 with a fourth threshold S4, a fifth comparator 25 similarly compares the multiplication result obtained by the third multiplication unit 15 with a fifth threshold S5, a sixth comparator 26 similarly compares the additional result obtained by the third addition unit 16 with a sixth threshold S6, a seventh comparator 27 similarly compares the multiplication result obtained by the fourth multiplication unit 17 with a seventh threshold S7, and an eighth comparator 28 similarly compares the additional result obtained by the fourth addition unit 18 with an eighth threshold S8.

A lateral acceleration determination unit 29 accepts the lateral acceleration Gy from the lateral acceleration sensor 3. When this lateral acceleration Gy is equal to or larger than a ninth predetermined threshold S9 (i.e., Gy>=S9), the lateral acceleration determination unit 29 outputs a trigger signal having a value of "1" to input terminals of first and second AND gates 31 and 32 respectively connected to output terminals of the first and second comparators 21 and 22. On the other hand, when the lateral acceleration Gy is smaller than the ninth threshold S9 (i.e., Gy<S9), the lateral acceleration determination unit 29 outputs a trigger signal having a value of "1" to input terminals of third and fourth AND gates 33 and 34 connected to output terminals of the seventh and eighth comparators 27 and 28.

The output terminals of the first and second comparators 21 and 22 are connected to other input terminals of the first and second AND gates 31 and 32, respectively, and the output terminals of the seventh and eighth comparators 27 and 28 are similarly connected to other input terminals of the third and fourth AND gates 33 and 34. The third through sixth comparators 23 to 26 have output terminals connected to four input terminals of a first OR gate 35, respectively, and the output terminals of the third and fourth comparators 23 and 24 are further connected to input terminals of a second OR gate 36. The first through fourth AND gates 31 to 34 have output terminals connected to other input terminals of the second OR gate 36, respectively.

The first and second OR gates 35 and 36 have output terminals connected to input terminals of fifth and sixth AND gates 37 and 38, respectively, and these fifth and sixth AND gates 37 and 38 have other input terminals connected to output terminals of a safing determining unit 4c, respectively. When the lateral acceleration Gsy of the vehicle detected by a lateral acceleration sensor 5a for detection of side crash exceeds a predetermined value S10, the safing determining unit 4c furnishes a trigger signal having a value of "1" to the other input terminal of the sixth AND gate 38. On the other hand, when the tilt angle of the vehicle obtained by carrying out angle conversion on a DC component of an output of a lateral acceleration sensor 5b for detection of tilt angle is equal to or larger than a predetermined value S11, the safing determining unit 4c furnishes a trigger signal having a value of "1" to the other input terminal of the fifth AND gate 37.

A third OR gate 39 for implementing a logical OR operation on the outputs of the third and fourth AND gates 37 and 38 has input terminals respectively connected to the output terminals of the third and fourth AND gates 37 and 38. An output of the third OR gate 39 is furnished to a protection device 6. In accordance with this embodiment, the first through fourth multiplication units 11, 13, 15, and 17 and the first through fourth addition units 12, 14, 16, and 18 substantially constitute an arithmetic processing unit 4a, and the first through eighth comparators 21 to 28 and the lateral acceleration determination unit 29, the first through sixth AND gates 31 to 34, 37, and 38, and the first through third OR gates 35, 36, and 39 substantially constitute a rollover occurrence determining unit 4b.

Since the rollover determination apparatus in accordance with this embodiment operates in substantially the same way as those in accordance with embodiments 1 and 2, the explanation of the operation of the rollover determination apparatus in accordance with this embodiment will be omitted hereafter. As previously mentioned, the rollover determination apparatus determines whether the vehicle will roll over using all the multiplication determination equations associated with Rr×Gz, Rr×Gz×Ra, Rr×Ra, and Rr×Gy and all the addition determination equations associated with Rr+Gz, Rr+Gz+Ra, Rr+Ra, and Rr+Gy. As an alternative, the rollover determination apparatus determines whether the vehicle will roll over using one or more arbitrary multiplication determination equations and addition determination equations which are selected from all the multiplication determination equations and all the addition determination equations.

Figure 10:
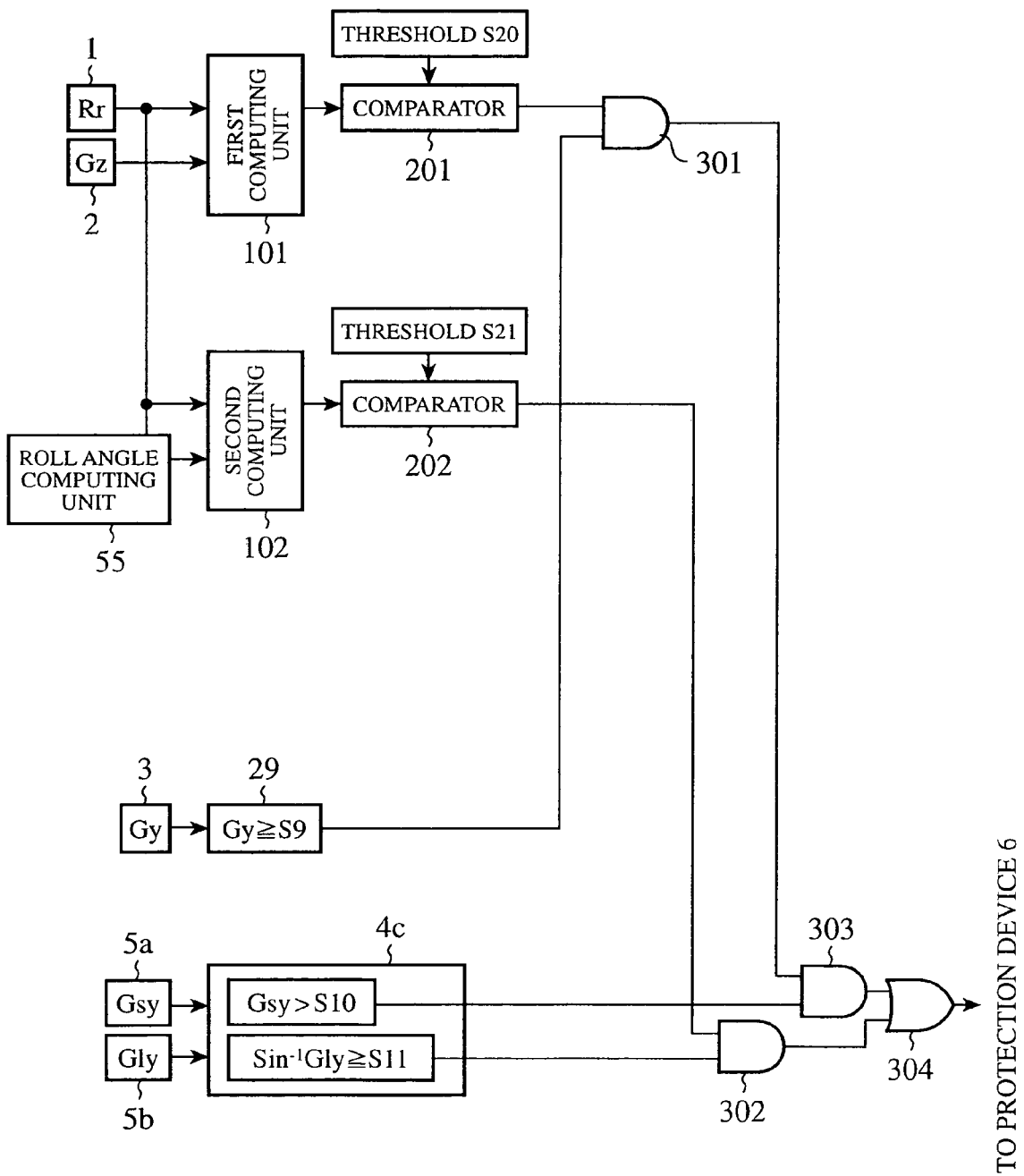
FIG. 10 is a diagram showing the internal structure of a determination unit of a rollover determination apparatus for vehicles in accordance with a variant of embodiment 3 of the present invention.

FIG. 10 shows the internal structure of a determination unit of a rollover determination apparatus for vehicles in accordance with a variant of embodiment 3 of the present invention. The determination unit 4 of this variant is provided with a first computing unit 101 for carrying out multiplication or addition of the roll angular velocity Rr of the vehicle detected by the roll angular velocity sensor 1 and the upward or downward acceleration Gz of the vehicle detected by the upward-or-downward-acceleration sensor 2, and a second computing unit 102 for carrying out multiplication or addition of the roll angular velocity Rr and the roll angle Ra of the vehicle, on an input side thereof. The determination unit 4 of this variant also includes a first comparator 201 for comparing the multiplication or addition result obtained by the first computing unit 101 with a first threshold S20, and a second comparator 202 for comparing the multiplication or addition result obtained by the second computing unit 102 with a second threshold S21. The first and second comparators 201 and 202 have output terminals respectively connected to the input terminals of first and second AND gates 301 and 302. The lateral acceleration determination unit 29 accepts the lateral acceleration Gy from the lateral acceleration sensor 3. When this lateral acceleration Gy is equal to or larger than a predetermined threshold S9 (i.e., Gy>=S9), the lateral acceleration determination unit 29 outputs a trigger signal having a value of "1" to another input terminal of the first AND gate 301.

The output terminal of the first AND gate 301 is connected to an input terminal of a third AND gate 303. The two output terminals of the safing determining unit 4c are connected to the other terminals of the second and third AND gates 302 and 303, respectively. When the lateral acceleration Gsy of the vehicle detected by the lateral acceleration sensor 5a for detection of side crash exceeds a predetermined value S10, the safing determining unit 4c furnishes a trigger signal having a value of "1" to the other input terminal of the third AND gate 303. On the other hand, when the tilt angle of the vehicle obtained by carrying out angle conversion on the DC component of the output of the lateral acceleration sensor 5b for detection of tilt angle is equal to or larger than a predetermined value S11, the safing determining unit 4c furnishes a trigger signal having a value of "1" to the other input terminal of the second AND gate 302. On the output sides of the second and third AND gates 302 and 303, there is provided an OR gate 304 for implementing a logical OR operation on the outputs of the second and third AND gates 302 and 303. An output of the OR gate 304 is furnished to the protection device 6. In this variant, the OR gate 304 can be replaced by an AND gate.

The determination unit of this variant of FIG. 10 is equivalent to the one in which the multiplication units 13 and 17 and the addition units 14 and 18, and the corresponding comparators 23, 24, 27, and 28 are removed from the determination unit of FIG. 8. As can be seen from the above description, the following three physical quantities of the vehicle: the roll angle Rr, roll angular velocity Rr, and upward or downward acceleration Gz of the vehicle are needed for determining whether the vehicle will roll over. Since the three physical quantities vary dependently upon one another, it is preferable to combine the three physical quantities into one or more functions for determination of whether the vehicle will roll over. The determination unit according to this variant can thus determine whether the vehicle will roll over by linking the three physical quantities with one another using a function showing the product or sum of the roll angular velocity Rr and the upward or downward acceleration Gz, and another function showing the product or sum of the roll angular velocity Rr and the roll angle Ra. However, the determination unit does not necessarily need to perform rollover determination using the three physical quantities: the roll angle Ra, roll angular velocity Rr, and upward or downward acceleration Gz of the vehicle. The determination unit can also perform rollover determination using at least two of the product and sum of the roll angular velocity Rr and the upward or downward acceleration Gz, and the product and sum of the roll angular velocity Rr and the roll angle Ra.

Figure 11:
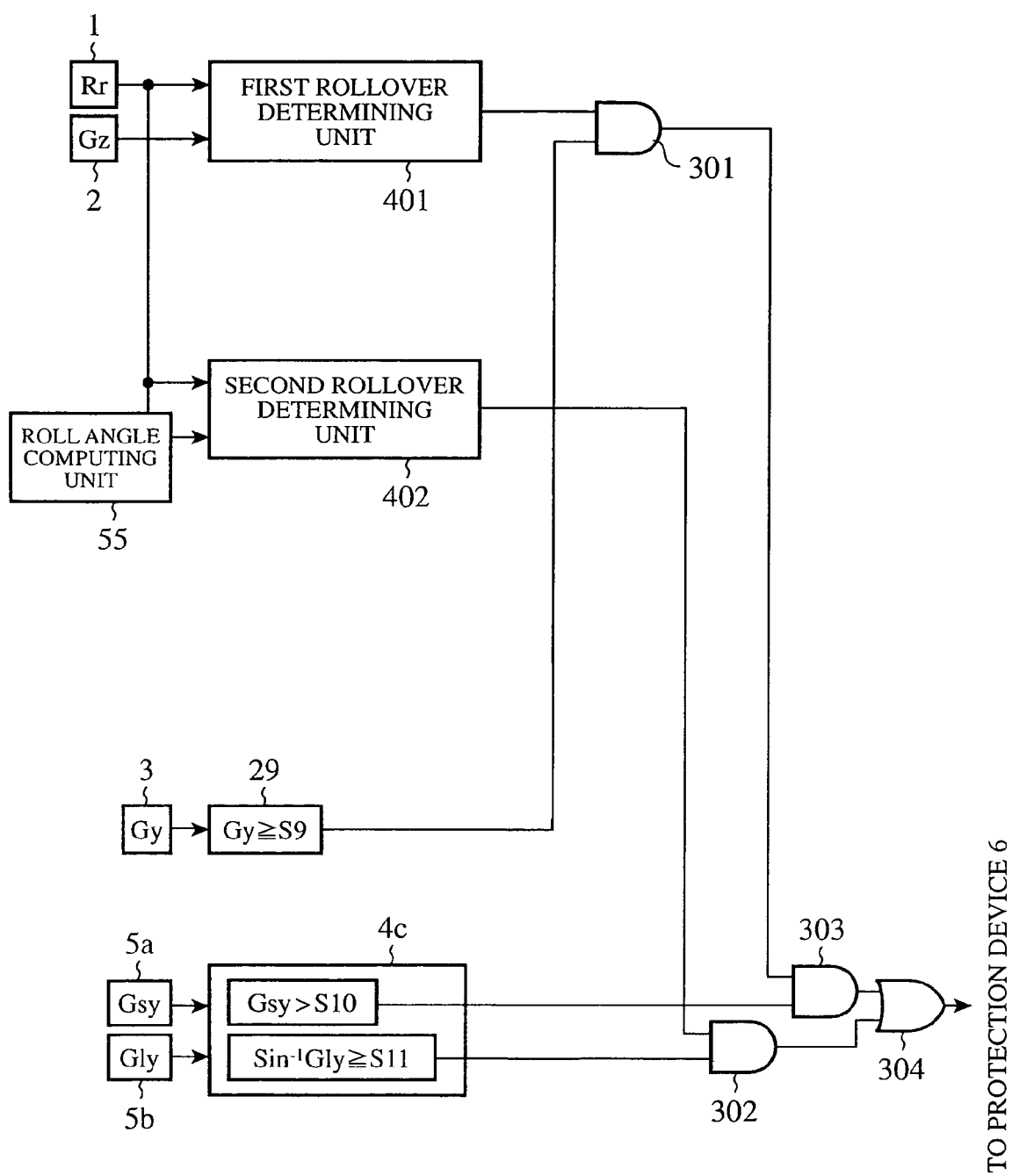
FIG. 11 is a diagram showing the internal structure of a determination unit of a rollover determination apparatus for vehicles in accordance with another variant of embodiment 3 of the present invention.

FIG. 11 shows the internal structure of a determination unit of a rollover determination apparatus for vehicles in accordance with another variant of embodiment 3 of the present invention. In the figure, the same components as those of the above-mentioned variant are designated by the same reference numerals as shown in FIG. 10, and therefore the explanation of those components will be omitted hereafter. Instead of the first and second computing units 101 and 102 of the variant shown in FIG. 10, the determination unit 4 of FIG. 11 is provided with a first rollover determining unit 401 for determining whether the vehicle will roll over by using a first rollover determination map defined by a combination of the product and sum of the roll angular velocity Rr of the vehicle detected by the roll angular velocity sensor 1 and the upward or downward acceleration Gz of the vehicle detected by the upward-or-downward-acceleration sensor 2, and a second rollover determining unit 402 for determining whether the vehicle will roll over by using a second rollover determination map defined by a combination of the product and sum of the roll angular velocity Rr and roll angle Ra of the vehicle. The first and second rollover determining units 401 and 402 have output terminals respectively connected to input terminals of the first and second AND gates 301 and 302. In this variant, the OR gate 304 can be replaced by an AND gate.

Figure 12A:
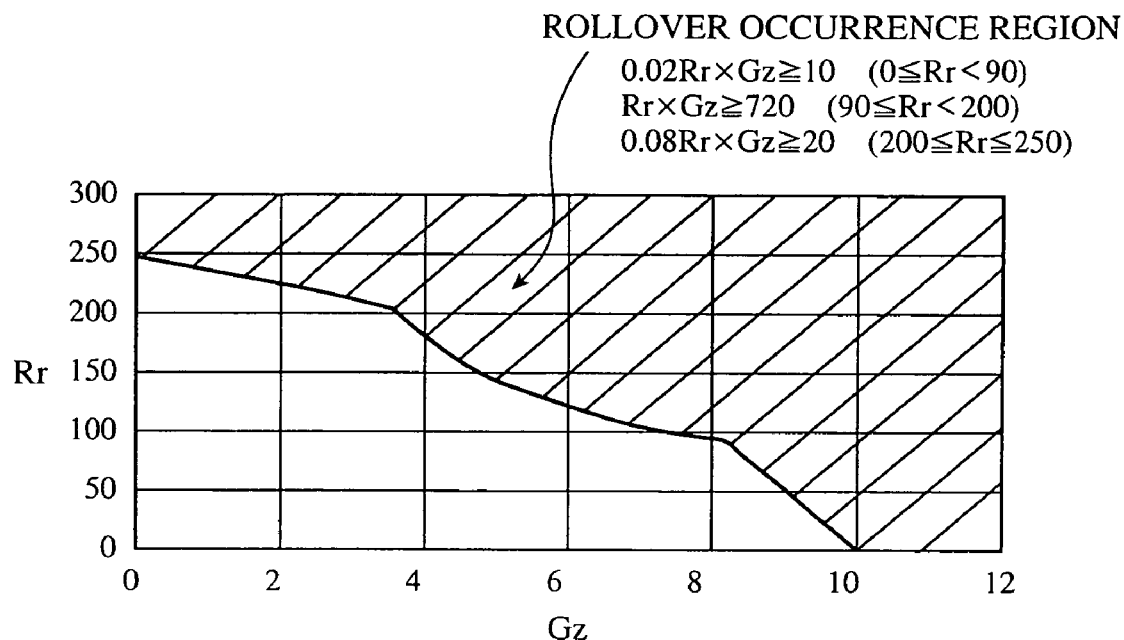
FIGS. 12A and 12B are diagrams respectively showing concrete examples of FIGS. 9A and 9B.
Figure 12B:
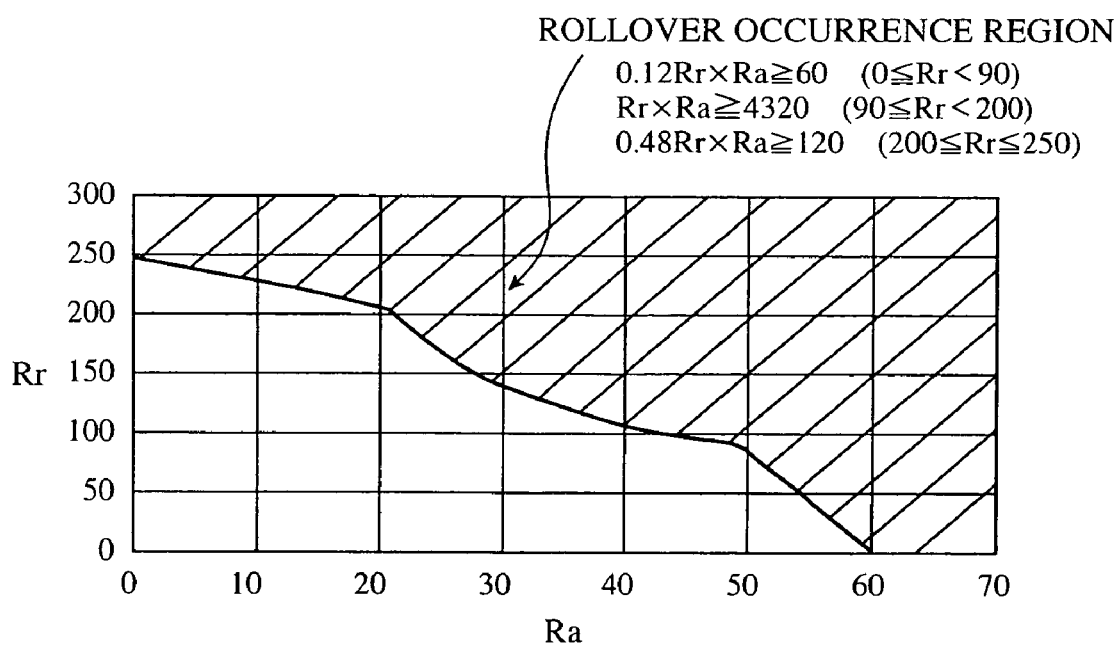

FIG. 12A shows a concrete example of the first rollover determination map, and FIG. 12B shows a concrete example of the second rollover determination map. In this case, the first rollover determining unit 401 of FIG. 11 determines whether a point having coordinates (Gz, Rr) exists in a rollover occurrence region shown in FIG. 12A, and, when determining that the point exists in the rollover occurrence region, outputs a signal having a value of "1" to the first AND gate 301. Similarly, the second rollover determining unit 402 of FIG. 11 determines whether a point having coordinates (Ra, Rr) exists in a rollover occurrence region shown in FIG. 12B, and, when determining that the point exists in the rollover occurrence region, outputs a signal having a value of "1" to the second AND gate 302.

Figure 13:
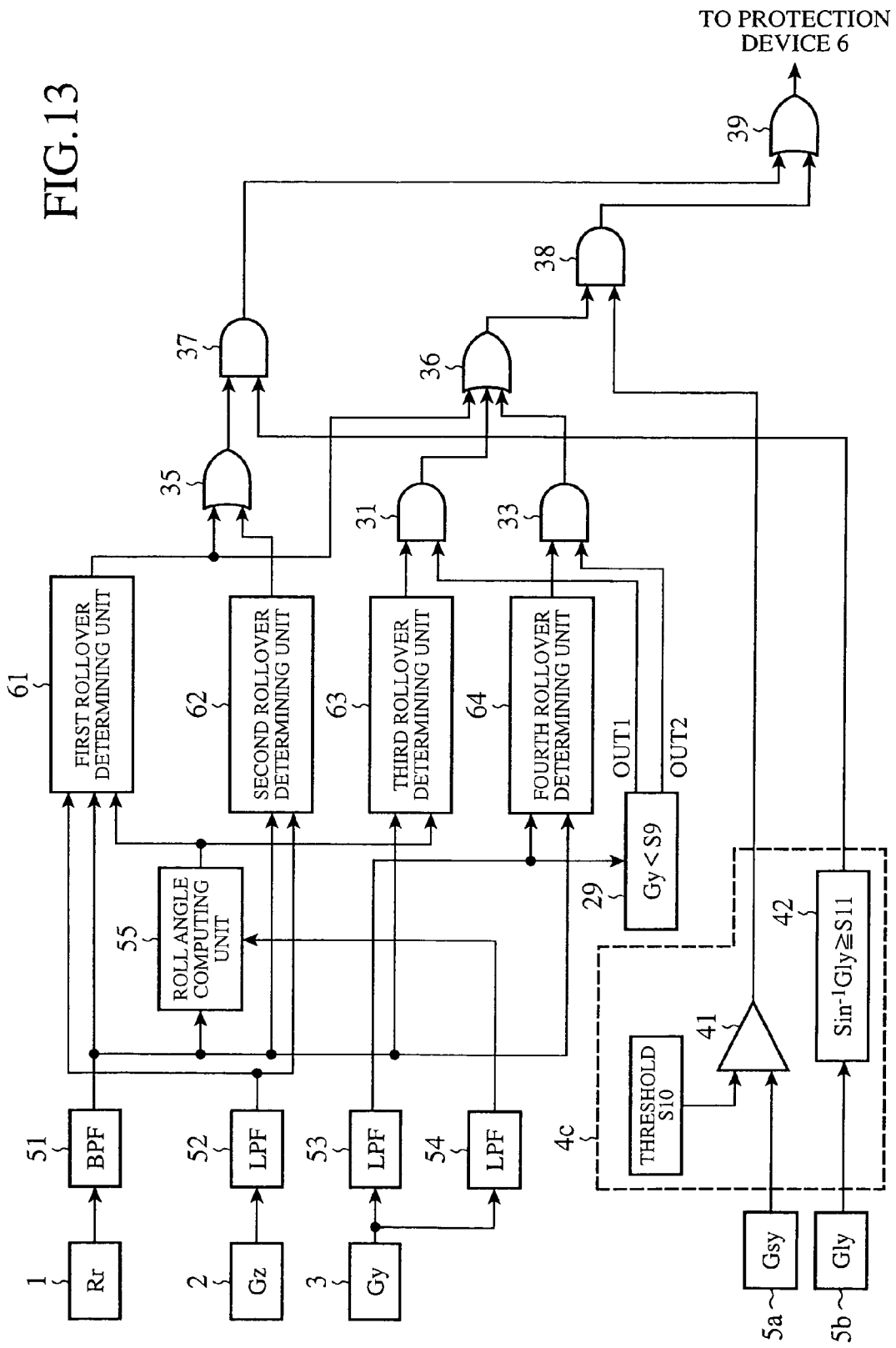
FIG. 13 is a diagram showing a rollover determination apparatus for vehicles in accordance with a further variant of embodiment 3 of the present invention.

FIG. 13 is a circuit diagram showing a rollover determination apparatus for vehicles in accordance with a further variant of embodiment 3 of the present invention. In this figure, the same components as those of the rollover determination apparatus of above-mentioned embodiment 1 are designated by the same reference numerals as shown in FIG. 3, and therefore the explanation of those components will be omitted hereafter. The rollover determination apparatus of FIG. 13 is provided with a first rollover determining unit 61 for determining whether the vehicle will roll over by using a first rollover determination map defined by a combination of the product and sum of the roll angular velocity Rr of the vehicle detected by the roll angular velocity sensor 1, the upward or downward acceleration Gz of the vehicle detected by the upward-or-downward-acceleration sensor 2, and the roll angle Ra of the vehicle computed by the roll angle computing unit 55, a second rollover determining unit 62 for determining whether the vehicle will roll over by using a second rollover determination map defined by a combination of the product and sum of the roll angular velocity Rr and upward or downward acceleration Gz of the vehicle, a third rollover determining unit 63 for determining whether the vehicle will roll over by using a third rollover determination map defined by a combination of the product and sum of the roll angular velocity Rr and roll angle Ra of the vehicle, and a fourth rollover determining unit 64 for determining whether the vehicle will roll over by using a fourth rollover determination map defined by a combination of the product and sum of the roll angular velocity Rr and the lateral acceleration Gy of the vehicle from the lateral acceleration sensor 3. Each of the first through fourth rollover determining units 61 to 64 determines whether a point having coordinates (Gz, Ra, Rr), (Gz, Rr), (Ra, Rr) or (Gy, Rr) exists in a rollover occurrence region, and, when determining that the point exists in the rollover occurrence region, outputs a signal having a value of "1", like the rollover determining units 401 and 402 shown in FIG. 11.

The first rollover determining unit 61 has an output terminal connected to input terminals of first and second OR gates 35 and 36. The second rollover determining unit 62 has an output terminal connected to another input terminal of the first OR gate 35. The third rollover determining unit 63 has an output terminal connected to an input terminal of a first AND gate 31. The fourth rollover determining unit 64 has an output terminal connected to an input terminal of a second AND gate 33.

As mentioned above, this embodiment 3 offers the same advantage as provided by above-mentioned embodiment 1. In addition, the rollover determination apparatus can determine whether the vehicle will roll over by using a combination of one or more multiplication determination equations, each of which is the product of two or more parameters, and addition determination equations, each of which is the addition of two or more parameters (or two or more weighted parameters) (e.g., by determining whether any one of all the multiplication and addition determination equations exceeds a corresponding threshold or determining whether any two of them exceed corresponding thresholds, respectively). Therefore, in accordance with embodiment 3, each threshold line, i.e., the boundary of each rollover occurrence region can be determined finely by forming a combination of on or more curved portions (each corresponding to the product of two or more parameters) and one or more straight line portions (each corresponding to the sum of two or more parameters) on the rollover determination threshold map, and hence the measurement accuracy can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A rollover determination apparatus for vehicles comprising:
    a roll angular velocity detecting means for detecting, as a roll angular velocity, a rotational angular velocity of a vehicle about a longitudinal axis extending lengthwise through the vehicle;
    an upward-or-downward-acceleration detecting means for detecting, as an upward or downward acceleration, an acceleration in an upward or downward direction of the vehicle;
    an arithmetic processing means for carrying out arithmetic processing on both the roll angular velocity detected by said roll angular velocity detecting means and the upward or downward acceleration detected by said upward-or-downward-acceleration detecting means; and
    a rollover occurrence determining means for determining whether the vehicle will roll over based on a processing result of said arithmetic processing means,
    wherein when a product of the roll angular velocity and the upward or downward acceleration, which is the processing result of said arithmetic processing means, exceeds a predetermined threshold, said rollover occurrence determining means determines that said vehicle will roll over.

2. The rollover determination apparatus according to claim 1, wherein said arithmetic processing means carries out arithmetic processing on both the detected roll angular velocity and the detected upward or downward acceleration at a given time.

3. The rollover determination apparatus according to claim 1, wherein said arithmetic processing means carries out arithmetic processing on the detected roll angular velocity in relation to the detected upward or downward acceleration.

4. A rollover determination apparatus for vehicles comprising:
    a roll angular velocity detecting means for detecting, as a roll angular velocity, a rotational angular velocity of a vehicle about a longitudinal axis extending lengthwise through the vehicle;
    an upward-or-downward-aeceleration detecting means for detecting, as an upward or downward acceleration, an acceleration in an upward or downward direction of the vehicle;
    an arithmetic processing means for carrying out arithmetic processing on both the roll angular velocity detected by said roll angular velocity detecting means and the upward or downward acceleration detected by said upward-or-downward-acceleration detecting means; and
    a rollover occurrence determining means for determining whether the vehicle will roll over based on a processing result of said arithmetic processing means,
    wherein when a sum of the roll angular velocity and the upward or downward acceleration, which is the processing result of said arithmetic processing means, exceeds a predetermined threshold, said rollover occurrence determining means determines that said vehicle will roll over.

5. A rollover determination apparatus for vehicles comprising:
    a roll angular velocity detecting means for detecting, as a roll angular velocity, a rotational angular velocity of a vehicle about a longitudinal axis extending lengthwise through the vehicle;
    a roll angle computing means for computing a roll angle of the vehicle based on the roll angular velocity detected by said roll angular velocity detecting means and a time which has elapsed since the detection result of said roll angular velocity detecting means satisfied a certain condition;
    an arithmetic processing means for carrying out arithmetic processing on the roll angular velocity detected by said roll angular velocity detecting means and the roll angle computed by said roll angle computing means,
    a rollover occurrence determining means for determining whether said vehicle will roll over based on a processing result of said arithmetic processing means.

6. The rollover determination apparatus for vehicles according to claim 5, wherein said roll angle computing means computes the roll angle by using a detection result of a lateral acceleration detecting means for detecting, as a lateral acceleration, an acceleration of the vehicle in a lateral direction of the vehicle when a state in which the roll angular velocity is smaller than a predetermined value lasts for a predetermined time period, or by integrating the roll angular velocity and then adding the lateral acceleration detected by said lateral acceleration detection means to the integration of the roll angular velocity when the roll angular velocity is larger than the predetermined value.

7. The rollover determination apparatus for vehicles according to claim 6, wherein said apparatus further comprises a safing determination means for determining a tilt angle and an amount of acceleration of the vehicle based on the lateral acceleration detected by said lateral acceleration detection means.

8. The rollover determination apparatus according to claim 5, wherein said arithmetic processing means carries out arithmetic processing on the detected roll angular velocity in relation to the detected upward or downward acceleration.

9. A rollover determination apparatus for vehicles comprising:
a roll angular velocity detecting means for detecting, as a roll angular velocity, a rotational angular velocity of a vehicle about a longitudinal axis extending lengthwise through the vehicle;
an upward-or-downward-acceleration detecting means for detecting, as an upward or downward acceleration, an acceleration in an upward or downward direction of the vehicle;
a roll angle computing means for computing a roll angle of said vehicle based on the roll angular velocity detected by said roll angular velocity detecting means and a time which has elapsed since the roll angular velocity detected by said roll angular velocity detecting means satisfied a certain condition; and
a rollover occurrence determining means for determining whether the vehicle will roll over using at least two of:
a product of the roll angular velocity and the upward or downward acceleration;
a sum of the roll angular velocity and the upward or downward acceleration;
a product of the roll angular velocity and the roll angle; and
a sum of the roll angular velocity and the roll angle.

10. The rollover determination apparatus for vehicles according to claim 9, wherein said rollover occurrence determining means can determine that the vehicle will roll over when the product or sum of the roll angular velocity and the upward or downward acceleration exceeds a predetermined threshold and the product or sum of the roll angular velocity and the roll angle exceeds a predetermined threshold.

11. The rollover determination apparatus for vehicles according to claim 10, wherein said rollover occurrence determining means stores a rollover determination threshold map associated with the product or sum of the roll angular velocity and the upward or downward acceleration, and a rollover determination threshold map associated with the product or sum of the roll angular velocity and the roll angle.

12. The rollover determination apparatus for vehicles according to claim 9, wherein said roll angle computing means computes the roll angle by using a detection result of a lateral acceleration detecting means for detecting, as a lateral acceleration, an acceleration of the vehicle in a lateral direction of the vehicle when a state in which the roll angular velocity is smaller than a predetermined value lasts for a predetermined time period, or by integrating the roll angular velocity and then adding the lateral acceleration detected by said lateral acceleration detection means to the integration of the roll angular velocity when the roll angular velocity is larger than the predetermined value.

13. The rollover determination apparatus for vehicles according to claim 12, wherein said apparatus further comprises a safing determination means for determining a tilt angle and an amount of acceleration of the vehicle based on the lateral acceleration detected by said lateral acceleration detection means.

* * * * *